US009600016B2

(12) United States Patent
Waki

(10) Patent No.: US 9,600,016 B2
(45) Date of Patent: Mar. 21, 2017

(54) CONTROL DEVICE AND CONTROL METHOD

(71) Applicant: PANASONIC CORPORATION, Osaka (JP)

(72) Inventor: Yuki Waki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 968 days.

(21) Appl. No.: 13/826,897

(22) Filed: Mar. 14, 2013

(65) Prior Publication Data

US 2013/0289773 A1 Oct. 31, 2013

(30) Foreign Application Priority Data

Apr. 26, 2012 (JP) ................................ 2012-101852

(51) Int. Cl.
*G05B 21/00* (2006.01)
*G05B 15/00* (2006.01)
(Continued)

(52) U.S. Cl.
CPC ...................................... *G05F 5/00* (2013.01)

(58) Field of Classification Search
CPC .... F24F 11/00; F24F 11/0009; F24F 11/0012; F24F 2011/0013; F24F 11/006; G05B 15/02; Y02B 70/3275; Y04S 20/244
(Continued)

(56) References Cited

U.S. PATENT DOCUMENTS 5,924,486 A * 7/1999 Ehlers .................... F24F 11/006 165/238
8,010,237 B2 * 8/2011 Cheung .............. G05B 13/0245 165/238
(Continued)

FOREIGN PATENT DOCUMENTS

EP 2 251 614 11/2010
JP 10-30834 2/1998
(Continued)

OTHER PUBLICATIONS

"Release the latest Z/S series of Advanced Room-Air Conditioner [nocria®]", from the website of Fujitsu General, http://www.fujitsu-general.com/jp/news/2011/11/11-N05-21/index.html, released on Nov. 17, 2011 and its partial English translation.

*Primary Examiner* — Ronald Hartman, Jr.
(74) *Attorney, Agent, or Firm* — Wenderoth, Lind & Ponack, L.L.P.

(57) ABSTRACT

A control device includes: a receiving unit that receives a control request signal indicating a request for controlling a total power amount during a predetermined period to be equal to or lower than a predetermined limit; an obtainment unit that obtains a power consumption amount; and a control unit that controls an apparatus to operate according to the control request signal and controls the total power amount to be equal to or lower than the predetermined limit. The control unit determines a first time in the predetermined period based on the power consumption amount obtained by the obtainment unit, controls the apparatus to operate during a first period up to the first time with power higher than average power, and controls the apparatus to operate during a second period from the first time with power lower than the average power.

15 Claims, 13 Drawing Sheets

(51) Int. Cl.

| | |
|---|---|
| ***G01M 1/38*** | (2006.01) |
| ***G05D 23/00*** | (2006.01) |
| ***G05D 3/12*** | (2006.01) |
| ***G05D 5/00*** | (2006.01) |
| ***G05D 9/00*** | (2006.01) |
| ***G05D 17/00*** | (2006.01) |
| ***G05D 11/00*** | (2006.01) |
| ***G05F 5/00*** | (2006.01) |

(58) Field of Classification Search
USPC .......................................... 700/276, 291, 299
See application file for complete search history.

(56) References Cited

U.S. PATENT DOCUMENTS

| | | | | |
|---|---|---|---|---|
| 8,024,073 | B2 * | 9/2011 | Imes | F24F 11/006 700/19 |
| 8,350,697 | B2 * | 1/2013 | Trundle | F24F 11/0086 340/539.26 |
| 8,355,827 | B2 * | 1/2013 | Egnor | G06Q 50/06 700/291 |
| 8,417,391 | B1 * | 4/2013 | Rombouts | G05B 13/02 700/286 |
| 8,442,695 | B2 * | 5/2013 | Imes | F24F 11/0086 236/51 |
| 8,740,100 | B2 * | 6/2014 | Steinberg | F24F 11/006 236/46 C |
| 2011/0046806 | A1 * | 2/2011 | Nagel | H04L 67/125 700/291 |
| 2012/0259469 | A1 * | 10/2012 | Ward | G05D 23/1917 700/276 |
| 2012/0305661 | A1 * | 12/2012 | Malchiondo | F24F 11/0012 236/44 A |

FOREIGN PATENT DOCUMENTS

| | | |
|---|---|---|
| JP | 10-309037 | 11/1998 |
| JP | 2006-158146 | 6/2006 |
| JP | 2008-306870 | 12/2008 |
| JP | 2009-204221 | 9/2009 |
| JP | 2011-2191 | 1/2011 |
| JP | 2012-19579 | 1/2012 |
| JP | 2013-79772 | 5/2013 |

* cited by examiner

CONTROL DEVICE AND CONTROL METHOD

CROSS REFERENCE TO RELATED APPLICATION

The present application claims the benefit of Japanese Patent Application No. 2012-101852 filed Apr. 26, 2012. The entire disclosure of the above-identified application, including the specification, drawings and claims is incorporated herein by reference in its entirety.

FIELD

One or more exemplary embodiments disclosed herein relate to control devices that control apparatuses to operate with desired power.

BACKGROUND

Conventionally, there are control devices that control apparatuses to operate with desired power. Patent Literature 1 discloses a technology relating to such a control device.

CITATION LIST

Patent Literature

[Patent Literature 1] Japanese Unexamined Patent Application Publication No. 10-309037.

Technical Problem

However, the conventional control device sometimes fails to serve enough to efficiently operate apparatuses.

One non-limiting and exemplary embodiment provides a control device capable of controlling apparatuses to efficiently operate.

SUMMARY

Solution to Problem

In one general aspect, the techniques disclosed here feature a control device including: a receiving unit configured to receive a control request signal, the control request signal indicating a request for controlling a total power amount consumed by an apparatus during a predetermined period to be equal to or lower than a predetermined limit; an obtainment unit configured to obtain a power consumption amount consumed by the apparatus; and a control unit configured to control the apparatus to operate according to the control request signal received by the receiving unit, and control the total power amount consumed by the apparatus during the predetermined period to be equal to or lower than the predetermined limit, wherein the control unit is configured to: determine a first time in the predetermined period, based on the power consumption amount obtained by the obtainment unit; control the apparatus to operate during a first period from a start of the predetermined period to the first time with power higher than average power calculated based on the predetermined limit and the predetermined period; and control the apparatus to operate during a second period from the first time to end of the predetermined period with power lower than the average power.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The control device according to one or more exemplary embodiments or features disclosed herein is capable of controlling an apparatus to efficiently operate.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Underlying Knowledge Forming Basis of the Present Disclosure

In order to control power consumption, a Demand Response (DR) is sometimes used. In this case, for example, a demand response signal (DR signal) is transmitted to apparatuses corresponding to the DR. The DR signal is a signal used to request for restriction on a power consumption amount of apparatuses during a predetermined period (DR period). In receiving the DR signal, the apparatuses corresponding to the DR shift to operate with low power consumption.

More specifically, in Australian standards, for operation of air conditioners receiving a DR signal, a mode is defined so that such an air conditioner should be operated by restricting its power consumption amount in 30 minutes to rated power consumption of the air conditioner×75%×0.5 h.

Conventionally, for a method of restricting a power consumption amount, the technique disclosed in Patent Literature 1, for example, is known. In Patent Literature 1, turning ON and turning OFF of power are repeated. A time ratio of an ON period to an OFF period is switched to another according to a reduction ratio of a power consumption amount. As a result, a power consumption amount of an apparatus is reduced to a desired power consumption amount.

However, if power is reduced, an operation amount of the apparatus is also decreased, thereby failing to execute the ability of the apparatus at the best. This state is kept during the reduced power. As a result, the benefits that the apparatus should offer are reduced.

Figure 1:
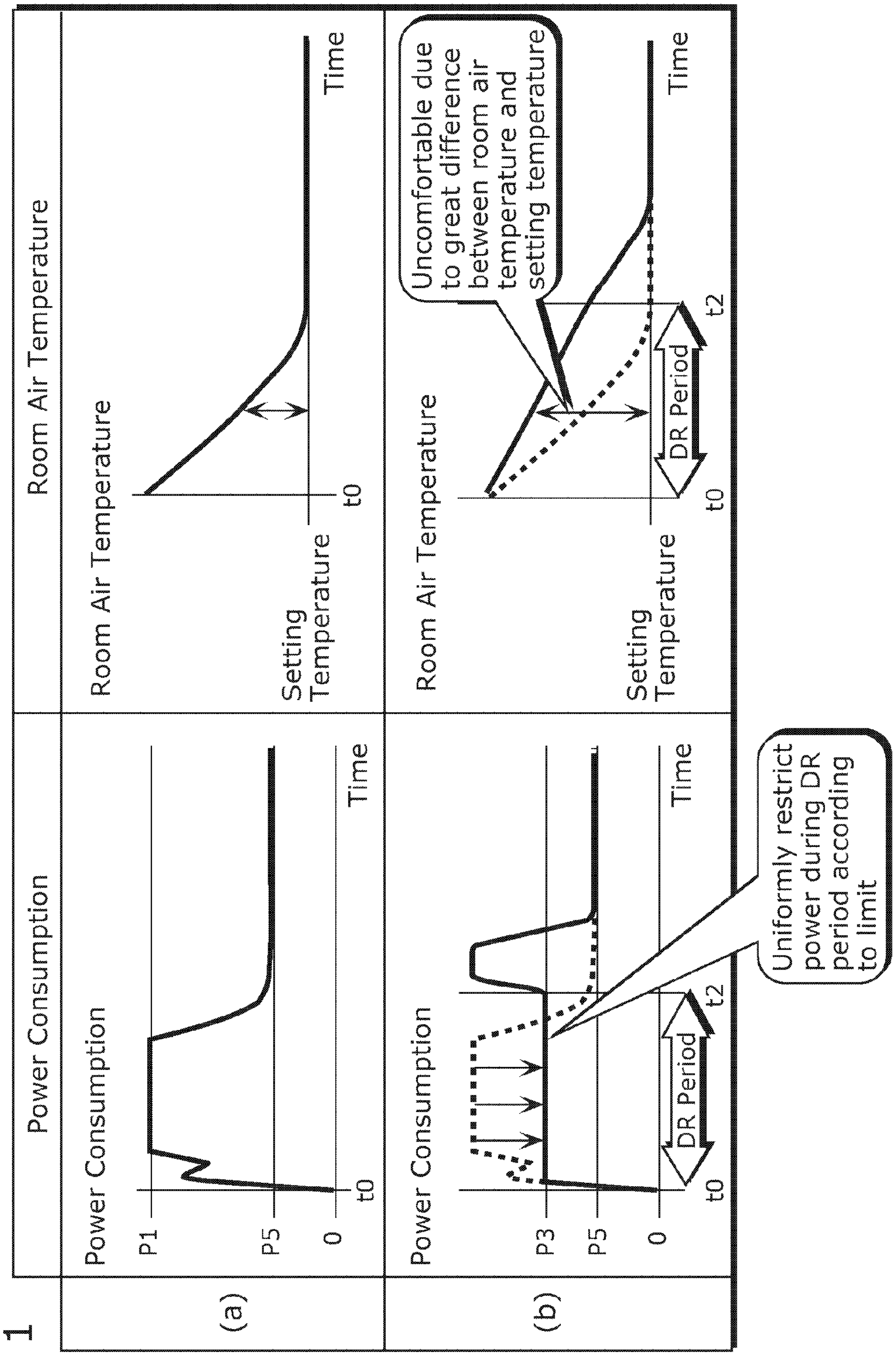
FIG. 1 is a diagram showing changes in power consumption and changes in a room air temperature regarding an apparatus according to a reference example.

FIG. 1 is a diagram showing changes in power consumption and changes in a room air temperature regarding an apparatus (air conditioner) according to a reference example. (a) in FIG. 1 shows changes in power consumption and changes in a room air temperature in the case where a DR signal is not received, in other words, in the case where DR control is not performed. On the other hand, (b) in FIG. 1 shows changes in power consumption and changes in a room air temperature in the case where a DR signal is received, in other words, in the case where DR control is performed. In the reference example of FIG. 1, the air conditioner is turned ON at time to.

At the start of the operation, a difference between a room air temperature and a setting temperature (target temperature) is relatively great. Therefore, power consumption of the air conditioner is increased. Then, if any DR signal is not received ((a) in FIG. 1), the power consumption reaches power P1. After that, when the room air temperature approaches the setting temperature, the power consumption is reduced. Then, when the room air temperature reaches the setting temperature, the power consumption becomes power P5. After that, the air conditioner is kept operating with power P5 to keep the room air temperature to the setting temperature.

On the other hand, if a DR signal is received ((b) in FIG. 1), a power consumption amount during a DR period is restricted. For example, a power consumption amount in 30 minutes is restricted to rated power consumption×75%×0.5 h. In the reference example shown in (b) in FIG. 1, the power consumption during the DR period is uniformly restricted. Then, the power consumption is kept to be power P3 corresponding to rate power consumption×75%. Therefore, the ability of the air conditioner is restricted in a time zone where a temperature difference between the room air temperature and the setting temperature is great. As a result, the room air temperature is not cooled soon, and that would diminish comfort.

According to an exemplary embodiment disclosed herein, a control device including: a receiving unit configured to receive a control request signal, the control request signal indicating a request for controlling a total power amount consumed by an apparatus during a predetermined period to be equal to or lower than a predetermined limit; an obtainment unit configured to obtain a power consumption amount consumed by the apparatus; and a control unit configured to control the apparatus to operate according to the control request signal received by the receiving unit, and control the total power amount consumed by the apparatus during the predetermined period to be equal to or lower than the predetermined limit, wherein the control unit is configured to: determine a first time in the predetermined period, based on the power consumption amount obtained by the obtainment unit; control the apparatus to operate during a first period from a start of the predetermined period to the first time with power higher than average power calculated based on the predetermined limit and the predetermined period; and control the apparatus to operate during a second period from the first time to end of the predetermined period with power lower than the average power.

In this way, during the first period immediately after the receipt of the request, the apparatus operates with relatively high power consumption. Then, during the second period following the first period, the apparatus operates with relatively low power consumption. These periods are switched according to a power consumption amount. As a result, a total power amount during a predetermined period is appropriately controlled. In addition, the apparatus can execute its ability earlier. In other words, the apparatus can efficiently provide benefits that the apparatus should offer. Therefore, the control device can control the apparatus to efficiently operate.

For example, the control unit may be configured to control the apparatus that is an air conditioner to operate to control the total power amount consumed by the apparatus during the predetermined period to be equal to or lower than the predetermined limit.

In this way, during the first period, the apparatus can cause the room air temperature to be close to the setting temperature with relatively high power consumption. As a result, even if a total power consumption amount is restricted during a predetermined period, the apparatus can cause the room air temperature to be close to the setting temperature sooner. Therefore, even if a total power amount is restricted, diminishing of comfort is suppressed.

For example, the control unit may be configured to control the apparatus to operate during the second period with power that is equal to or lower than an upper limit, the upper limit being power for keeping a room air temperature in a predetermined range, the upper limit being power lower than the average power.

In this way, during the second period, the apparatus operates with power equal to or lower than an appropriate upper limit. For example, power for keeping the room air temperature in a predetermined range where comfort is maintained is set as the upper limit. Then, the apparatus operates with such power equal to or lower than upper limit during the second period. As a result, it is possible to satisfy the request for restriction on a total power amount and also suppress diminishing of comfort.

For example, the control unit may be configured to control the apparatus to operate during the second period with power that is equal to or lower than an upper limit, the upper limit being power for keeping a room air temperature to be equal to or lower than a room air temperature at the first time, the upper limit being power lower than the average power.

In this way, during the second period, the apparatus operates with power equal to or lower than an appropriate upper limit. For example, if a room air temperature in a cooling state is kept equal to or lower than the room air temperature at a first time, comfort is maintained at and after the first time. Power for keeping the above state is set as the upper limit. Then, the apparatus operates with such power equal to or lower than the upper limit during the second period. As a result, it is possible to satisfy the request for restriction on a total power amount and also suppress diminishing of comfort.

For example, the control unit may be configured to control the apparatus to operate during the second period with power that is equal to or lower than an upper limit, the upper limit being power for keeping a room air temperature to be equal to or higher than a room air temperature at the first time, and the upper limit being power lower than the average power.

In this way, during the second period, the apparatus operates with power equal to or lower than an appropriate upper limit. For example, if a room air temperature in a warming state is kept equal to or higher than the room air temperature at a first time, comfort is maintained at and after the first time. Power for keeping the above state is set as the upper limit. Then, the apparatus operates with such power equal to or lower than the upper limit during the second period. As a result, it is possible to satisfy the request for restriction on a total power amount and also suppress diminishing of comfort.

For example, the obtainment unit may be configured to further obtain an outside air temperature and a room air temperature, and the control unit may be configured to calculate the upper limit according to the outside air temperature and the room air temperature, and control the apparatus to operate during the second period with power equal to or lower than the upper limit.

In this way, the calculation of the upper limit uses an outside air temperature and a room air temperature. An upper limit that is a value of power satisfying conditions of the room air temperature is expected to depend on an outside air temperature and the room air temperature. Therefore, by using the outside air temperature and the room air temperature, an appropriate upper limit is calculated.

For example, the control unit may be configured to multiply (a) a temperature difference between the outside air temperature and the room air temperature by (b) a numeric value obtained from rated power consumption of the apparatus to obtain the upper limit.

In this way, the calculation of the upper limit uses a temperature difference between an outside air temperature and a room air temperature. An upper limit that is a value of power satisfying conditions of the room air temperature is expected to depend on a temperature difference between an outside air temperature and the room air temperature. Therefore, by using the temperature difference between the outside air temperature and the room air temperature, an appropriate upper limit is calculated. Furthermore, by using also a numeric value obtained from a rated power consumption, an appropriate upper limit is calculated according to the rated power consumption.

For example, the obtainment unit may be configured to:

obtain the outside air temperature as a first outside air temperature and obtain the room air temperature as a first room air temperature; and obtain a second outside air temperature in a stable state where a room air temperature is kept constant, a second room air temperature in the stable state, and a power consumption amount per unit time in the stable state, from a storage unit holding a plurality of outside air temperatures at past times, room air temperatures at the past times, and power consumption amounts per unit time at the past times, and the control unit may be configured to multiply (a) a ratio of (a-1) a temperature difference between the first outside air temperature and the first room air temperature to (a-2) a temperature difference between the second outside air temperature and the second room air temperature by (b) the power consumption amount per the unit time in the stable state to obtain the upper limit.

In this way, the calculation of the upper limit uses a temperature difference between an outside air temperature and a room air temperature. An upper limit that is a value of power satisfying conditions of the room air temperature is expected to depend on a temperature difference between an outside air temperature and the room air temperature. Therefore, by using the temperature difference between the outside air temperature and the room air temperature, an appropriate upper limit is calculated. Furthermore, by using also past information, a more appropriate upper limit is calculated.

For example, the obtainment unit may be configured to obtain a power consumption amount during an operation period from start of the predetermined period to a current time, as the power consumption amount consumed by the apparatus, wherein the control unit may be configured to: calculate a power consumption amount consumed by the apparatus during a remaining period from the current time to end of the predetermined time, when the apparatus operates during the remaining period with power equal to the upper limit; and determine whether or not a sum of (a) the power consumption amount during the operating period and (b) the power consumption amount during the remaining period is equal to the predetermined limit, and if the sum is equal to the predetermined limit, determine the current time as the first time.

In this way, according to a power consumption amount consumed up to a current time, the first time for switching the first period to the second period is appropriately determined.

For example, the obtainment unit may be configured to obtain, as the power consumption amount consumed by the apparatus, a power consumption amount prior to the predetermined period from a storage unit holding the power consumption amount prior to the predetermined period, the control unit may be configured to: estimate a power consumption amount consumed by the apparatus during an estimated target period from start of the predetermined period to a second time, according to the power consumption amount obtained by the obtainment unit; calculate a power consumption amount consumed by the apparatus during a remaining period from the second time to the end of the predetermined time, when the apparatus operates during the remaining period with power equal to the upper limit; and determine whether or not a sum of (a) the power consumption amount during the estimated target period and (b) the power consumption amount during the remaining period satisfies conditions determined according to the predetermined limit, and if the sum satisfies the conditions, decide the second time as the first time.

In this way, according to a power consumption amount that has been consumed, the first time for switching the first period to the second period is appropriately determined.

For example, the obtainment unit may be configured to: obtain, from the storage unit, a power consumption amount per unit time in a fluctuating state different from the stable state, as the power consumption amount consumed by the apparatus; and further obtain a third outside air temperature in the fluctuating state and a third room air temperature in the fluctuating state from the storage unit, and the control unit may be configured to: multiply (a) a ratio of (a-1) a temperature difference between the first outside air temperature and the first room air temperature to (a-2) a temperature difference between the third outside air temperature and the third room air temperature by (b) the power consumption amount per the unit time in the fluctuating state, to estimate a power consumption amount consumed by the apparatus during an estimated target period from start of the predetermined period to the second time; calculate a power consumption amount consumed by the apparatus during a remaining period from the second time to end of the predetermined time, when the apparatus operates during the remaining period with power equal to the upper limit; and determine whether or not a sum of (a) the power consumption amount during the estimated target period and (b) the power consumption amount during the remaining period satisfies conditions determined according to the predetermined limit, and if the sum satisfies the conditions, decide the second time as the first time.

In this way, according to a ratio of a temperature difference, a power consumption amount that will be consumed is appropriately estimated. Therefore, the first time for switching the first period to the second period is appropriately determined.

For example, the obtainment unit may be configured to obtain a fourth room air temperature after the fluctuating state from the storage unit, the control unit may be configured to: estimate a room air temperature at the second time as the first room air temperature used to calculate the upper limit, according to the fourth room air temperature; the control unit is configured to multiply (a) a ratio of (a-1) the temperature difference between the first outside air temperature and the first room air temperature to (a-2) the temperature difference between the second outside air temperature and the second room air temperature by (b) the power consumption amount per the unit time in the stable state to obtain the upper limit; and calculate the power consumption amount consumed by the apparatus during the remaining period, when the apparatus operates during the remaining period with power equal to the upper limit.

In this way, according to past information, a room air temperature is appropriately estimated. Therefore, the first time for switching the first period to the second period is appropriately determined.

For example, the control unit may be configured to: control the apparatus to operate during the first period, by increasing power consumed by the apparatus to be higher than the average power; and control the apparatus to operate during the second period, by decreasing the power consumed by the apparatus from the power higher than the average power to power lower than the average power.

In this way, even if a total power consumption amount is restricted to a predetermined restriction value, power is appropriately varied. Therefore, the control device can control the apparatus to efficiently operate.

For example, the obtainment unit may be configured to obtain, as the power consumption amount consumed by the apparatus, one of (a) power consumption that is a power consumption amount per unit time consumed by the apparatus at presence or in past, (b) a power consumption amount consumed by the apparatus up to the current time, and (c) a power consumption consumed by the apparatus up to a past time.

In this way, by using the obtained information of power consumption amount, the control device can appropriately determine a time for switching.

For example, the control device may be included in the apparatus.

In this way, the apparatus itself can serve as the control device. As a result, it is not necessary to provide a separate control device.

For example, the receiving unit may be configured to receive the control request signal indicating a request for restricting the total power consumption consumed by a plurality of apparatuses each of which is the apparatus during the predetermined period, to be equal to or lower than the predetermined limit, the obtainment unit is configured to obtain the power consumption amount consumed by the plurality of apparatuses, and the control unit may be configured to: control the plurality of apparatuses to operate during the first period with power higher than the average power; and control the plurality of apparatuses to operate during the second period with power lower than the average power.

In this way, the control device can control a plurality of apparatuses to efficiently operate with appropriate power.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

In the following description, power refers to an instant power amount, in other words, a power amount per unit time. Likewise, power consumption refers to an instant power consumption amount, in other words, a power consumption per unit time.

Embodiment 1

Figure 2:
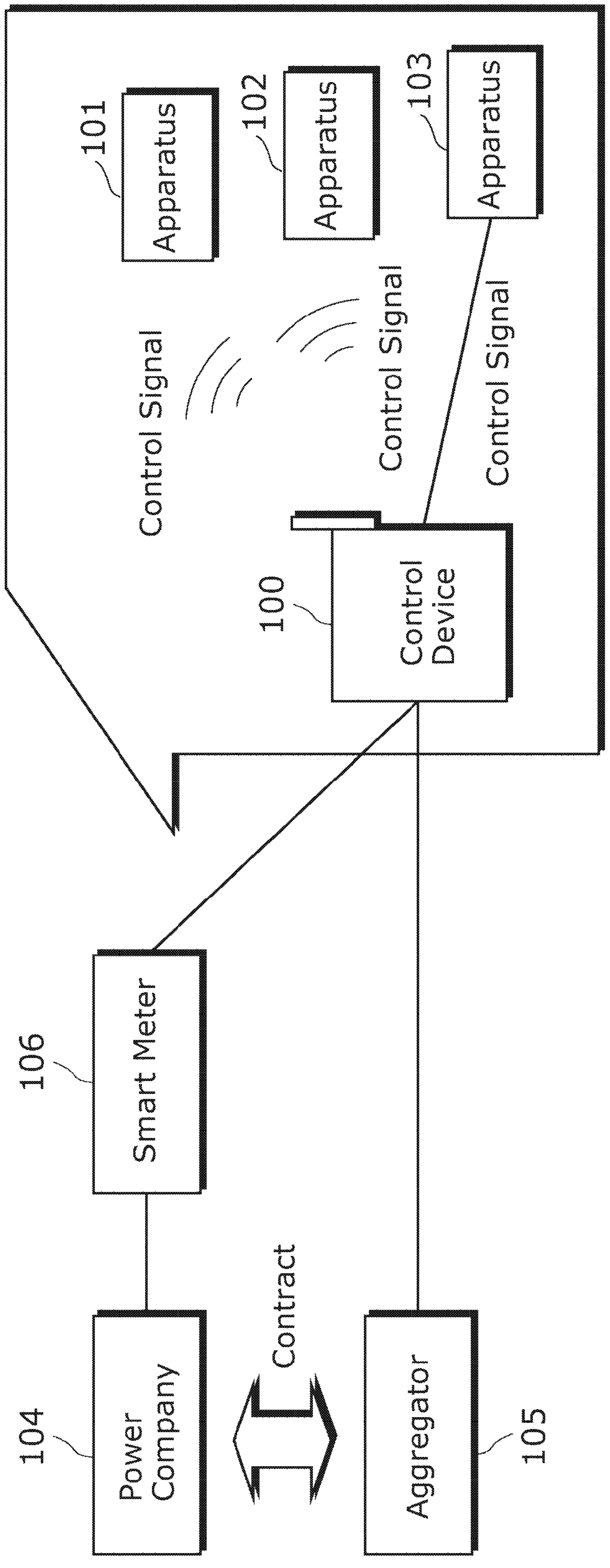
FIG. 2 is a diagram showing a configuration of a demand response system according to Embodiment 1.

FIG. 2 is a diagram showing a configuration of a demand response system (DR system) according to Embodiment 1. The DR system is a system that controls apparatuses of a consumer, such as a house or an office demanding power, so that power consumption of the consumer is reduced or redundant power in an electric system managed by a power company 104 is supplied to the consumer, according to a balance between a demand and a supply of the electric system.

For example, when power consumption is to be reduced, the power company 104 transmits a DR signal to consumers via the Internet and a smart meter 106 to notify the consumers of a request for DR. The smart meter 106 is a measurement device that measures power consumption or a power consumption amount. The smart meter 106 has a communication function. Therefore, the request for DR is notified to the consumers.

It is also possible that the power company 104 contracts with an aggregator 105 that deals with a plurality of small-lot consumers. In this case, the power company 104 requests the aggregator 105 for DR. Then, the aggregator 105 transmits a DR signal to each of the small-lot consumers. The aggregator 105 may transmit the DR signal via a communication network that the aggregator 105 has, or via a communication network that the power company 104 has.

A control device 100 of each of the consumers receives the transmitted DR signal. Then, the control device 100 transmits a control signal to a plurality of apparatuses 101, 102, and 103 via wired or wireless communication to operate the apparatuses 101, 102, and 103 according to the request for DR.

More specifically, in the case where the apparatus 101 is an air cooling apparatus, the control device 100 may increase a setting temperature of the apparatus 101. In the case where the apparatus 102 is an illumination apparatus, the control device 100 may lower illumination intensity of the apparatus 102. It is also possible that the control device 100 directly reduces power supplied to the apparatus 103.

As a result, according to the request for DR, the apparatuses 101, 102, and 103 operate with desired power. For each of the apparatuses 101, 102, and 103, the control device 100 may control a power consumption amount consumed in 30 minutes to be equal to or lower than rated power consumption×75%×0.5 h. A period during which a power consumption amount is reduced and a ratio of reducing the power consumption amount may be predetermined. It is also possible that the DR signal includes these pieces of information.

Typically, a request for DR is a request for controlling the apparatuses 101, 102, 103, and the like to restrict a power consumption amount (total power amount) consumed during a predetermined period (DR period) to be equal to or lower than a predetermined limit. According to the request, the control device 100 controls the apparatuses 101, 102, 103, and the like to appropriately operate. As a result, a peak of power demand is suppressed and stable power supply is expected.

In the following example, the apparatus 101 is assumed to be an air conditioner. In the following example, the control device 100 controls the apparatus 101 that is an air conditioner from among the apparatuses 101, 102, and 103.

Figure 3:
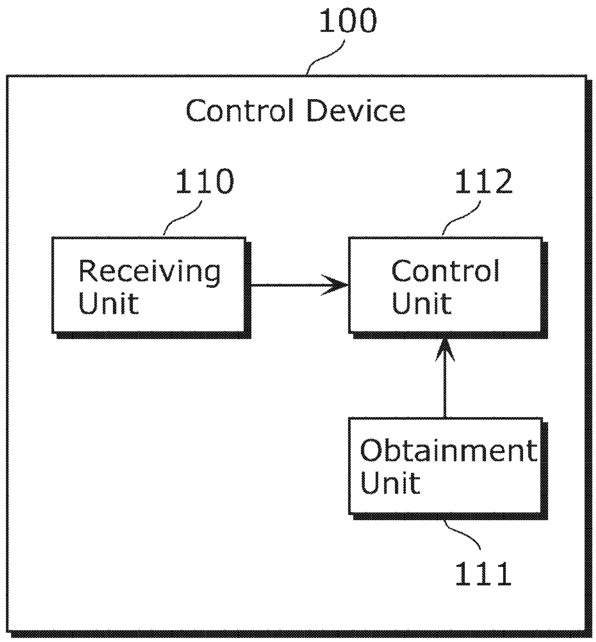
FIG. 3 is a block diagram of a control device according to Embodiment 1.

FIG. 3 is a block diagram of the control device 100 shown in FIG. 2. The control device 100 includes a receiving unit 110, an obtainment unit 111, and a control unit 112.

The receiving unit 110 receives a DR signal (control demand signal). The DR signal is a signal indicating a request for controlling the apparatus 101 to restrict a total power amount consumed in a DR period to be equal to or lower than a predetermined limit.

The obtainment unit 111 obtains data of a power consumption amount consumed by the apparatus 101. The obtainment unit 111 may obtain data of power consumption that is a power consumption amount per unit time which is or has been consumed by the apparatus 101. The obtainment unit 111 may obtain data of a power consumption amount consumed up to a current time by the apparatus 101. The obtainment unit 111 may obtain data of a power consumption amount consumed up to a past time by the apparatus 101. The obtainment unit 111 may obtain data of an outside air temperature and data of a room air temperature.

The obtainment unit 111 may have a function of measuring power consumption, a power consumption amount, an outside air temperature, a room air temperature and the like, or may obtain these pieces of data from a different measuring device (not shown).

The control unit 112 controls the apparatus 101 to operate according to the DR signal received by the receiving unit 110. Then, the control unit 112 controls the apparatus 101 to restrict a total power amount consumed during the DR period to be equal to or lower than a predetermined limit.

More specifically, the control unit 112 controls the apparatus 101 to operate during the first period with power higher than average power. More specifically, the control unit 112 controls the apparatus 101 to operate during the second period with power lower than the average power. The average power is power obtained by averaging the predetermined limit by the DR period. The first period is a period from (a) the start of the DR period to (b) a time for switching from the first period to the second period (hereinafter, referred to as a "time for switching"). The second period is a period from (b) the time for switching to (c) the end of the DR period.

Then, the control unit 112 determines the time for switching in the DR period, according to the data of the power consumption amount obtained by the obtainment unit 111.

Figure 4:
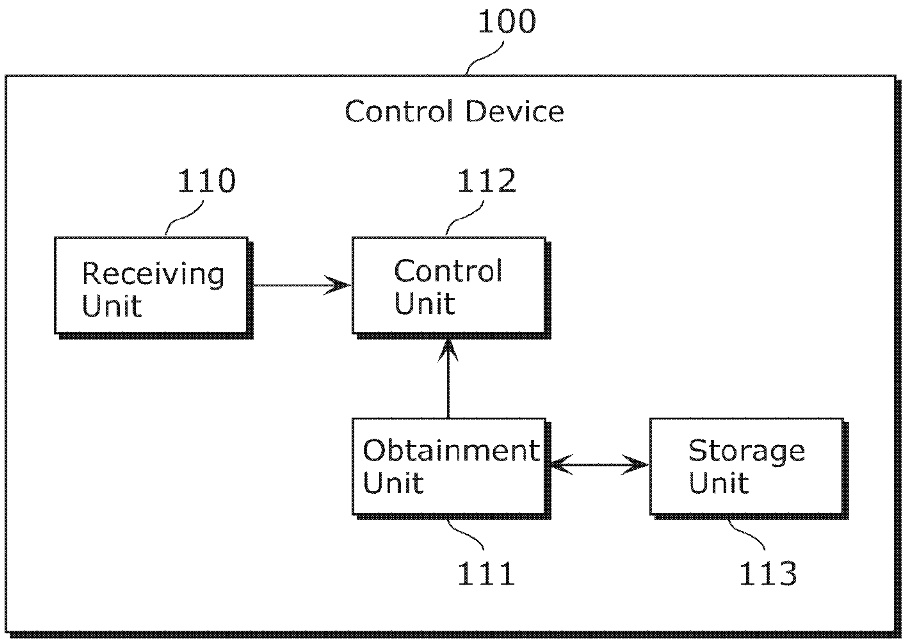
FIG. 4 is a block diagram of a control device according to a variation of Embodiment 1.

FIG. 4 is a block diagram of a variation of the control device 100 shown in FIG. 3. The control device 100 shown in FIG. 4 further includes a storage unit 113.

The storage unit 113 is a storage unit in which pieces of data of past outside air temperatures, pieces of data of past room air temperatures, pieces of data of past power consumption and the like are stored. The obtainment unit 111 obtains data of a current outside air temperature, data of a current room air temperature, data of current past power consumption and the like, and stores these pieces of data into the storage unit 113. The obtainment unit 111 can therefore obtain the data of the outside air temperature, the data of the room air temperature, the data of the power consumption, and the like which are stored in the storage unit 113, as data of a past outside air temperature, data of a past room air temperature, data of past power consumption, and the like. Then, the control unit 112 can control the apparatus 101 according to the data of the past outside air temperature, the data of the past room air temperature, the data of the past power consumption, and the like.

Figure 5:
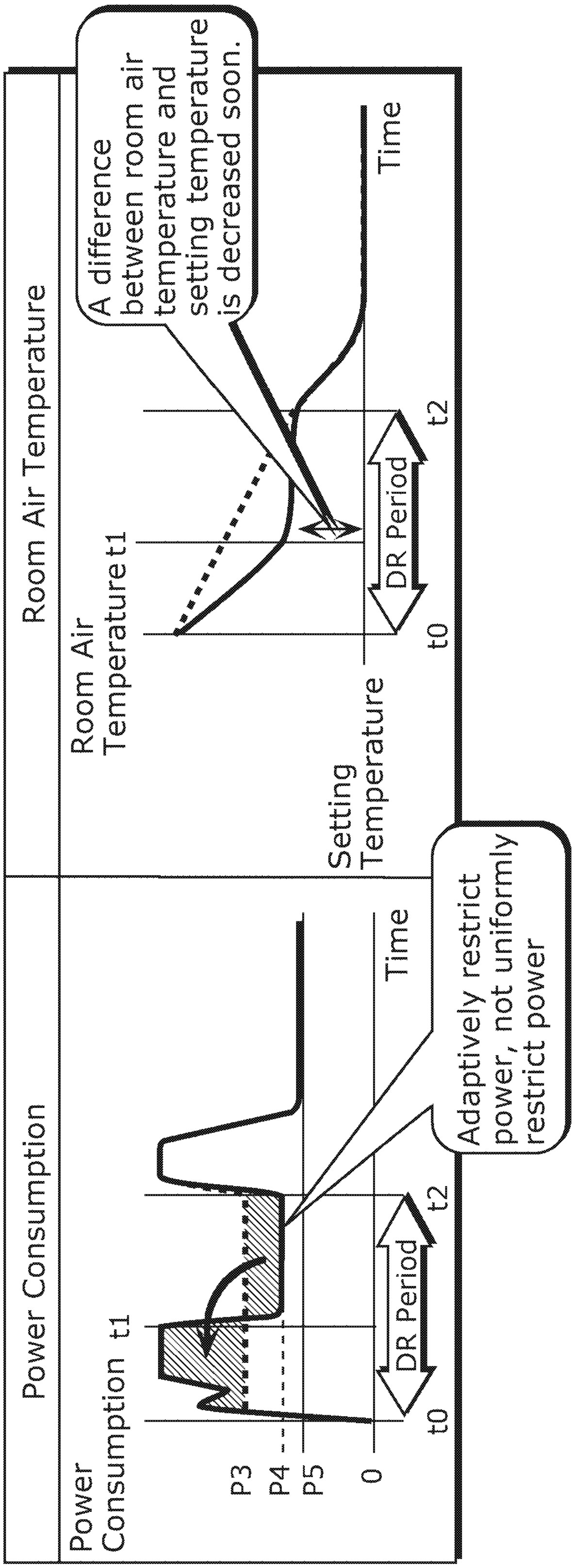
FIG. 5 is a diagram showing changes in power consumption and changes in a room air temperature according to Embodiment 1.

FIG. 5 is a diagram showing changes in power consumption and changes in room air temperature which are controlled by the control device 100 shown in FIGS. 3 and 4. In the example of FIG. 5, at time t0, the apparatus 101 as an air conditioner is turned ON. At time t0, a room air temperature is higher than a setting temperature. Therefore, the apparatus 101 performs cooling operation to cause the room air temperature to be closer to the setting temperature.

Furthermore, in the example of FIG. 5, at or before time t0, the receiving unit 110 receives a DR signal. The DR signal indicates a request for restriction on a total power amount consumed by the apparatus 101 during the DR period from time t0 to time t2 to be equal to or lower than a predetermined limit.

Then, during the first period from time t0 to time t1, the control unit 112 controls the apparatus 101 to operate with power higher than power P3. In other words, during the first period, the control unit 112 controls the apparatus 101 to operate to cause the power consumption of the apparatus 101 to be higher than the power P3. The power P3 is an average power obtained by averaging the predetermined limit by the DR period. For example, during the first period, the control unit 112 controls the apparatus 101 to operate in the same manner as a period rather than the DR period.

Then, during the second period from time t1 to time t2, the control unit 122 controls the apparatus 101 to operate with power lower than the power P3. In other words, during the second period, the control unit 112 controls the apparatus 101 to operate to cause the power consumption of the apparatus 101 to be lower than the power P3. For example, during the second period, the control unit 112 controls the apparatus 101 to keep the current room air temperature constant. In this case, the control unit 112 controls the apparatus 101 to operate with power P4 for keeping the current room air temperature constant.

In this way, power control of the control unit 112 is performed adaptively, not uniformly. Then, during the first period, relatively high power is supplied. Therefore, a temperature difference between the room air temperature and the setting temperature is decreased soon. As a result, diminishing of comfort is suppressed.

Moreover, according to a power consumption amount of the apparatus 101, the control unit 112 appropriately determines time t1 that is a time on the boundary between the first period and the second period. The control unit 112 thereby controls the apparatus 101 to restrict the total power amount consumed during the DR period to be equal to or lower than the predetermined limit.

In the example of FIG. 5, at time t0, the apparatus 101 is turned ON. However, the apparatus 101 may be turned ON before time t0. In this case, the control unit 112 also controls the apparatus 101 to operate with relatively high power during the first period, and with relatively low power during the second period. As a result, the same effects as described above can be offered.

Figure 6:
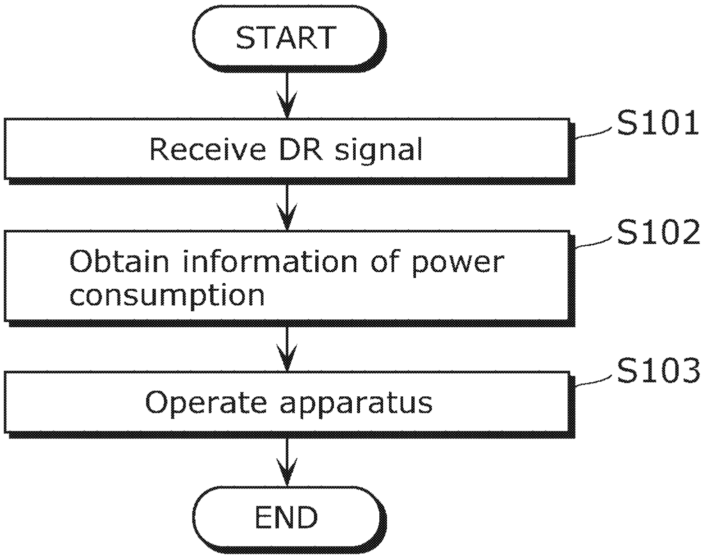
FIG. 6 is a flowchart of processing performed by the control device according to Embodiment 1.

FIG. 6 is a flowchart of processing performed by the control device 100 shown in FIGS. 3 and 4. First, the receiving unit 110 receives a DR signal (S101). Then, the obtainment unit 111 obtains data of a power consumption amount consumed by the apparatus 101 (S102).

Next, the control unit 112 controls the apparatus 101 to operate according to the DR signal received by the receiving unit 110 (S103). Then, the control unit 112 controls the apparatus 101 to restrict a total power amount consumed in the DR period to be equal to or lower than the predetermined limit.

Figure 7:
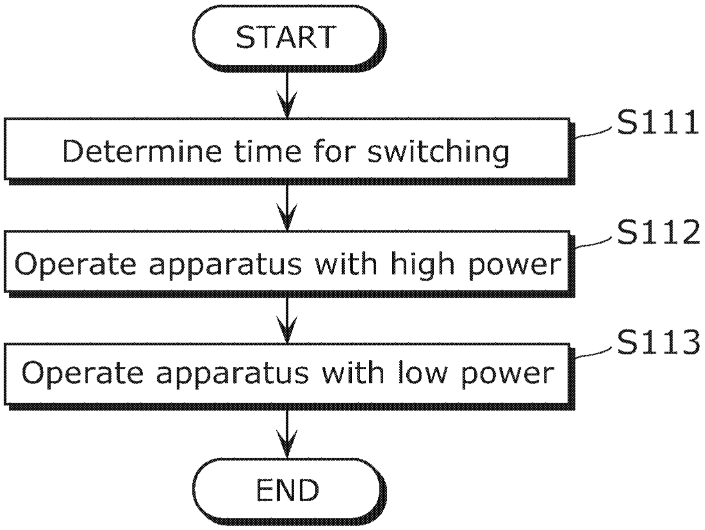
FIG. 7 is a flowchart of processing performed by the control device according to Embodiment 1.

FIG. 7 is a flowchart of processing performed by the control unit 112 shown in each of FIGS. 3 and 4. The flowchart of FIG. 7 corresponds to the step (S103) in FIG. 6 for operating the apparatus 101.

First, according to the data of the power consumption amount obtained by the obtainment unit 111, the control unit 112 determines time t1 (time for switching) in the DR period (S111). Then, during the first period from time t0 to time t1, the control unit 112 controls the apparatus 101 to operate with power higher than the power P3 (S112). Then, during the second period from time t1 to time t2, the control unit 112 controls the apparatus 101 to operate with power lower than the power P3 (S113).

More specifically, during the second period, the control unit 112 controls the apparatus 101 to operate with power equal to or lower than an upper limit lower than the power P3. The upper limit is set as a value of power for maintaining comfort. The upper limit may be a value of the power P4 for keeping a room air temperature to be the room air temperature at time t1.

In particular, when the apparatus 101 performing cooling operation, the upper limit may be a value of power for keeping a room air temperature to be equal to or lower than the room air temperature at time t1. On the other hand, when the apparatus 101 performing warming operation, the upper limit may be a value of power for keeping a room air temperature to be equal to or higher than the room air temperature at time t1. Furthermore, the upper limit may be a value of power for keeping a room air temperature in such a predetermined range.

It is desirable that the control unit 112 controls the apparatus 101 to operate with power of the upper limit in the second period to keep comfort. On the other hand, the control unit 112 may control the apparatus 101 to operate with power lower than the upper limit to surely control a total power amount during the DR period to be equal to or lower than the predetermined limit. This upper limit may be determined, as a value of power corresponding to conditions for room air temperature, according to an outside air temperature and a room air temperature.

Figure 8:
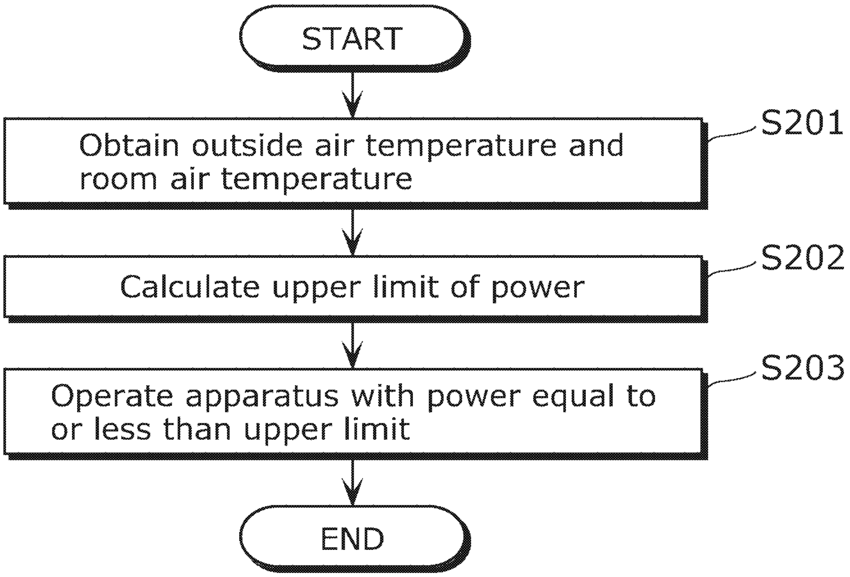
FIG. 8 is a flowchart of processing for determining an upper limit according to Embodiment 1.

FIG. 8 is a flowchart of processing performed by the control unit 112 at S113 in FIG. 7 to determine an upper limit of power consumption in the second period.

First, the obtainment unit 111 obtains data of an outside air temperature and data of a room air temperature (S201).

Next, based on the data of the outside air temperature and the data of the room air temperature, the control unit 112 calculates an upper limit of power supplied in the second period (S202). For example, the upper limit is a value of power P4 for keeping the room air temperature obtained by the obtainment unit 111. The control unit 112 calculates the upper limit corresponding to the value of the power P4 as presented below.

First, a relationship between an output of the apparatus 101 and power consumption of the apparatus 101 is expressed by the following Equation 1 using an efficiency coefficient.

$$\text{output}=\text{efficiency coefficient}\times\text{power consumption} \quad \text{(Equation 1)}$$

In other words, the output of the apparatus 101 is obtained by multiplying power consumption of the apparatus 101 by the efficiency coefficient. The efficiency coefficient in Equation 1 is derived by the following Equation 2, based on a rated output of the apparatus 101 and rated power consumption of the apparatus 101.

$$\text{efficiency coefficient}=\text{rated output}\times\text{rated power consumption} \quad \text{(Equation 2)}$$

On the other hand, heat loss from a room is derived by the following Equation 3, based on a room size, a heat loss coefficient (Q value) indicating heat insulation properties, and a temperature difference between an outside air temperature and a room air temperature.

$$\text{heat loss from room}=\text{room size}\times\text{heat loss coefficient}\times(\text{outside air temperature}-\text{room air temperature}) \quad \text{(Equation 3)}$$

When the output of the apparatus 101 is equal to heat loss from a room, the room air temperature is kept constant. Therefore, power consumption of the apparatus 101 for keeping the room air temperature constant is derived by Equation 4. In other words, the upper limit (power consumption) corresponding to a value of the power P4 is derived from Equation 4.

$$\text{power consumption}=\text{output}/\text{efficiency coefficient}=(\text{rated power consumption}/\text{rated output})\times\text{room size}\times\text{heat loss coefficient}\times(\text{outside air temperature}-\text{room air temperature}) \quad \text{(Equation 4)}$$

Then, during the second period, the control unit 112 controls the apparatus 101 to operate with power equal to or lower than the calculated upper limit (S203). Thereby, the power consumption amount during the second period is appropriately controlled. As presented in Equation 4, the control unit 112 multiplies the temperature difference between the outside air temperature and the room air temperature by the numeric value obtained from the rated power consumption of the apparatus 101 to obtain the upper limit.

Figure 9:
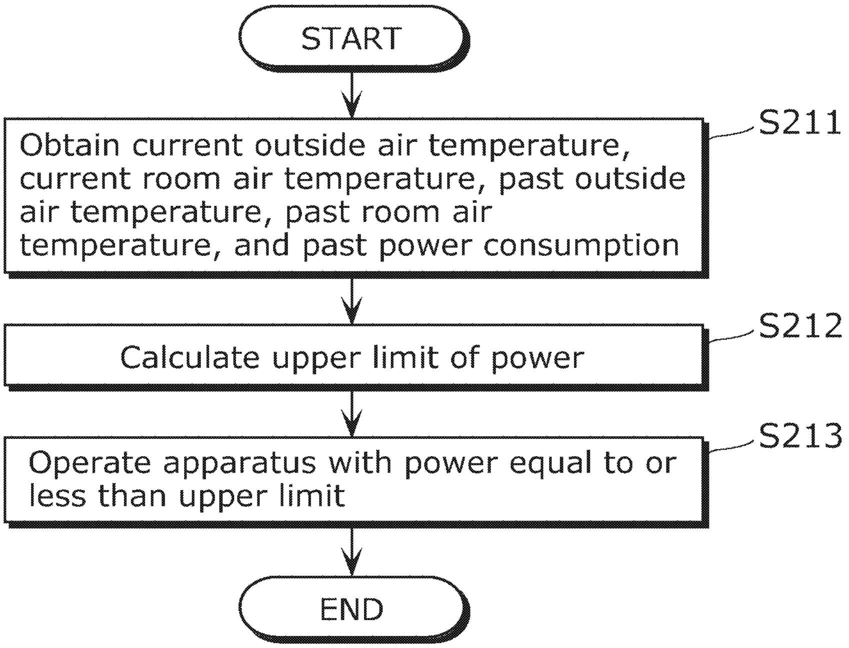
FIG. 9 is a flowchart of processing for determining an upper limit according to a variation of Embodiment 1.

Moreover, the control unit 112 may calculate the upper limit of the power consumption during the second period, based on past data as shown in FIG. 9, not using Equation 4.

FIG. 9 is a flowchart of processing performed by the control unit 112 shown in each of FIGS. 3 and 4 to determine an upper limit based on past pieces of data. As described in FIG. 8, the upper limit in the description with reference to FIG. 9 is a value of the power P4 for keeping a room air temperature constant.

First, the obtainment unit 111 obtains data of a current outside air temperature and data of a current room air temperature. In addition, the obtainment unit 111 obtains, from the storage unit 113, data of a past outside air temperature, data of a past room air temperature, and data of past power consumption of a past stable state (S211). Here, the stable state refers to a state where a room air temperature is kept constant. For example, power P5 in FIG. 5 is power consumption in a stable state.

Next, the control unit 112 calculates an upper limit (power consumption) by Equation 5 using a current outside air temperature o1, a current room air temperature r1, a past outside air temperature o3 in a past stable state, a past room air temperature r3 in the past stable state, and past power consumption c3 in the past stable state (S212). Thereby, the upper limit is calculated based on the power consumption in the past stable state.

$$\text{power consumption}=\text{past power consumption } c3\times(\text{outside air temperature } o1-\text{room air temperature } r1)/(\text{outside air temperature } o3-\text{room air temperature } r3) \quad \text{(Equation 5)}$$

Then, during the second period, the control unit 112 controls the apparatus 101 to operate with power equal to or lower than the calculated upper limit (S213). Thereby, the power consumption amount during the second period is appropriately controlled.

It should be noted that in FIG. 9, a current outside air temperature and a current room air temperature are used, but an outside air temperature and a room air temperature at time t1 may be used instead. This can provide more appropriate upper limit.

In Equation 5, the upper limit is calculated under assumption that a basic power consumption that does not depend on a temperature difference is zero. If the basic power consumption not depending on a temperature difference is not zero, the control unit 112 may calculate an upper limit by the following Equation 6.

$$\text{power consumption}=\text{past power consumption } c3+[\text{power consumption change rate } d\times\{(\text{current outside air temperature } o1-\text{current room air temperature } r1)-(\text{past outside air temperature } o3-\text{past room air temperature } r3)\}] \quad \text{(Equation 6)}$$

Here, the power consumption change rate d is a change rate of (a) power consumption to (b) a temperature difference between an outside air temperature and a room air temperature. For example, the power consumption change rate d is a change rate of power consumption per one degree of a temperature difference. More specifically, the power consumption change rate d is calculated by the following Equation 7.

$$\text{power consumption change rate } d=(\text{past power consumption } c3'-\text{past power consumption } c3)/\{(\text{outside air temperature } o3'-\text{room air temperature } r3')-(\text{outside air temperature } o3-\text{room air temperature } r3)\} \quad \text{(Equation 7)}$$

The outside air temperature o3', the room air temperature r3', and the power consumption c3' are a past outside air temperature, a past room air temperature, and past power consumption in a past stable state, and they are different from the outside air temperature o3, the room air temperature r3, and the power consumption c3.

The obtainment unit 111 may obtain the outside air temperature o3', the room air temperature r3', and the power consumption c3' in addition to the outside air temperature o3, the room air temperature r3, and the power consumption c3. Then, the control unit 112 may calculate the power consumption change rate d based on Equation 7. It is also possible that the control unit 112 calculates power consumption by using a previously-calculated power consumption change rate d and Equation 6.

Figure 10:
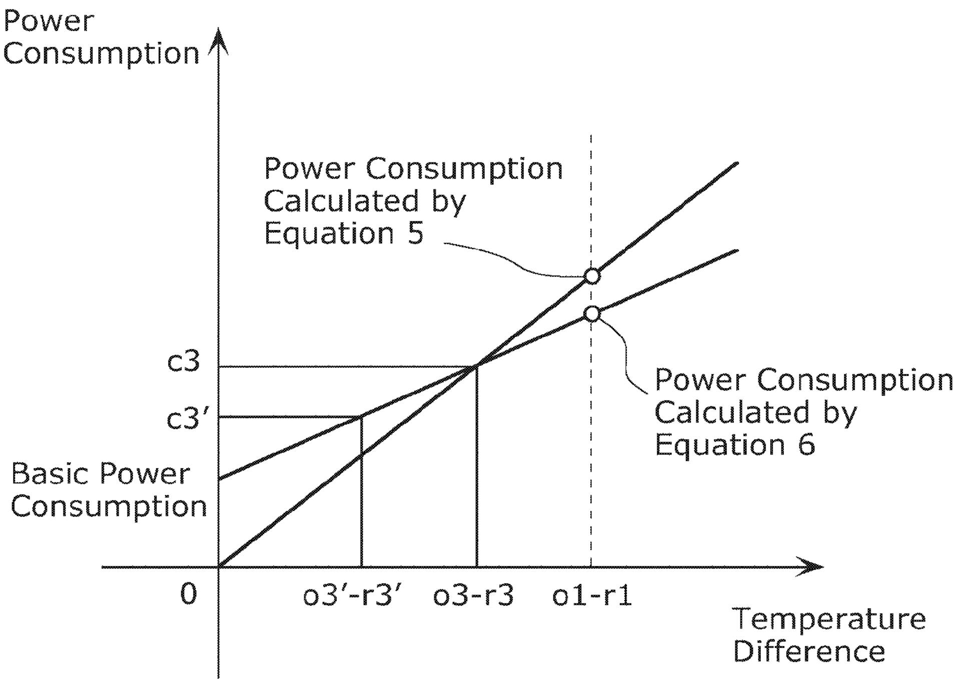
FIG. 10 is a graph plotting basic power consumption according to Embodiment 1.

FIG. 10 is a diagram showing a difference between Equation 5 in which a basic power consumption is not assumed and Equation 6 in which the basic power consumption is assumed. Even if the basic power consumption is not zero, the control unit 112 can appropriately calculate an upper limit (power consumption) by Equation 6.

In the flowchart of FIG. 6, after obtaining data of a power consumption amount, the apparatus 101 operates according to the power consumption amount. Furthermore, in the flowchart of FIG. 7, after determining the time for switching (time t1), the apparatus 101 operates according to the time for switching. However, the order of the steps is not limited to the order shown in each of FIGS. 6 and 7.

Figure 11:
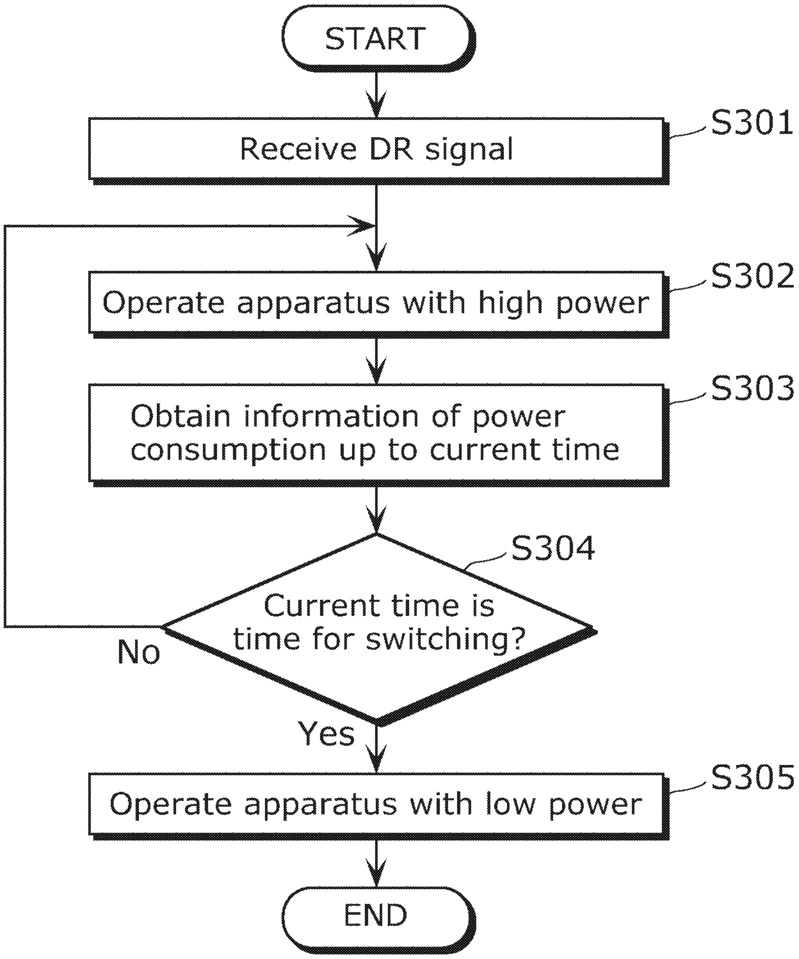
FIG. 11 is a flowchart for explaining in more detail the processing performed by the control device according to Embodiment 1.

FIG. 11 is a flowchart of processing performed by the control device 100 shown in each of FIGS. 3 and 4. The steps shown in FIG. 11 correspond to the steps shown in FIGS. 6 and 7.

First, the receiving unit 110 receives a DR signal (S301). Next, the control unit 112 controls the apparatus 101 to operate with power higher than the power P3 (S302). Then, the obtainment unit 111 obtains data of a power consumption amount consumed by the apparatus 101 during an operation period (S303). Here, the operation period is a period from start of a DR period to a current time. Next, the control unit 112 determines whether or not the current time is a time for switching (time t1) (S304).

Here, if the current time is not the time for switching (No at S304), then the control unit 112 continues to control the apparatus 101 to operate with power higher than the power P3 (S302), and the obtainment unit 111 and the control unit 112 repeat the subsequent steps (S303 and S304). On the other hand, if the current time is the time for switching (Yes at S304), then the control unit 112 controls the apparatus 101 to operate with power lower than the power P3 (S305). Typically, the control unit 112 controls the apparatus 101 to operate with power equal to or lower than the upper limit that is a value of the power P4.

Figure 12:
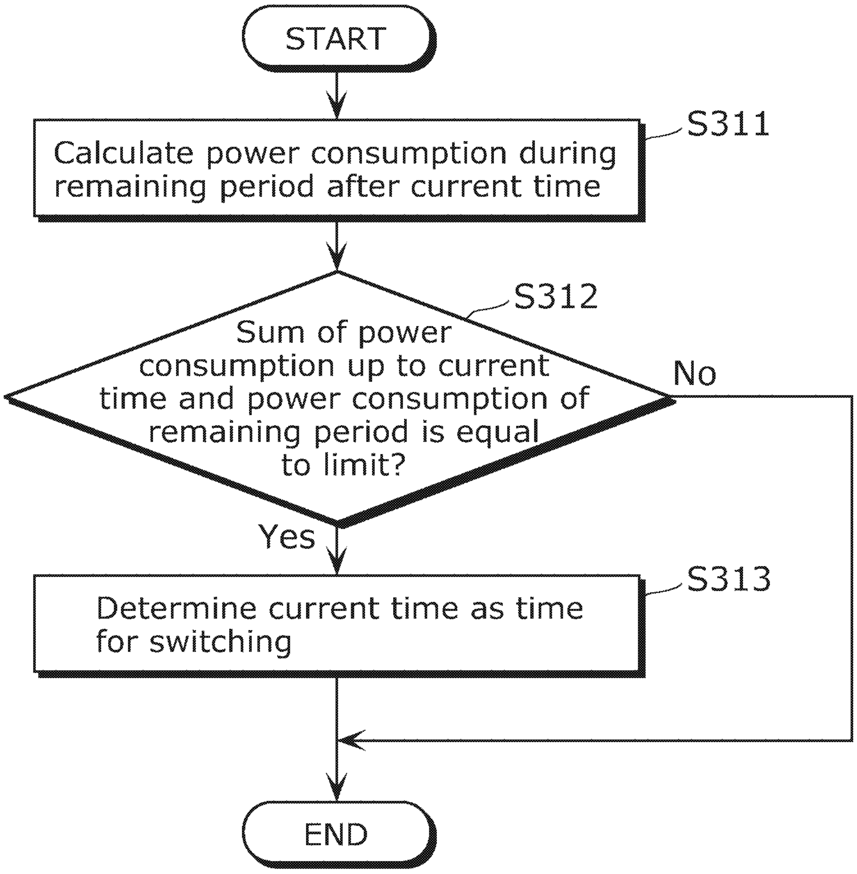
FIG. 12 is a flowchart of processing for determining a time for switching according to Embodiment 1.

FIG. 12 is a flowchart of the processing performed by the control unit 112 shown in each of FIGS. 3 and 4 to determine a time for switching. The flowchart in FIG. 12 corresponds to the step (S304) of determining a time for switching shown in FIG. 11.

First, the control unit 112 calculates a power consumption amount consumed by the apparatus 101 during a remaining period (S311). Here, the remaining period is a period from a current time to end of a DR period. For example, when the apparatus 101 is to operate in the second period with power equal to or lower than the upper limit calculated in the processing of FIG. 8 or 9, the control unit 112 multiplies the upper limit by the remaining period to obtain a power consumption amount during the remaining period.

Next, the control unit 112 determines whether or not a sum of (a) a power consumption amount from start of the DR period to the current time and (b) a power consumption amount during the remaining period is equal to a predetermined limit (S312). Then, if the sum is equal to the predetermined limit (Yes at S312), then the control unit 112 determines the current time as a time for switching (time t1) (S313). In other words, in this case, the control unit 112 determines the current time as the time for switching (time t1).

Here, the control unit 112 determines the current time as the time for switching when the sum of (a) the power consumption amount from the start of the DR period to the current time and (b) the power consumption amount during the remaining period is equal to the predetermined limit. However, the control unit 112 may determine the current time as the time for switching when the sum is the closest to the limit in a range where the sum does not exceed the limit. For example, the control unit 112 may determine that the sum is equal to the predetermined limit, also when the sum of (a) the power consumption amount from the start of the DR period to the current time and (b) the power consumption amount during the remaining period is almost equal to the predetermined limit.

On the other hand, if the sum is not equal to the predetermined limit (No at S312), then the control unit 112 does not determine the current time as the time for switching (time t1). In other words, in this case, the control unit 112 determines that the current time is not the time for switching (time t1).

The control device 100 controls the apparatus 101 to operate according to the flowcharts of FIGS. 11 and 12. Thereby, the apparatus 101 operates with high power during the first period and operates with low power during the second period. In addition, the control device 100 appropriately determines time t1 that is a boundary between the first period and the second period, based on the power consumption amount consumed up to the current time. As a result, the control of power consumption and a room air temperature which is shown in FIG. 5 is achieved.

It should be noted that the control unit 112 may determine time t1 that is the boundary between the first period and the second period, based on a power consumption amount consumed up to a past time, not the power consumption amount consumed up to the current time.

In this case, for example, the control unit 112 estimates a power consumption amount consumed during an estimated target period from the start of the DR period to an estimated target time as a power consumption amount consumed during the first period, based on a power consumption amount consumed up to a past time. Next, the control unit 112 calculates a power consumption amount during a remaining period from the estimated target time to the end of the DR period, as a power consumption amount corresponding to the second period. When a sum of (a) the power consumption amount during the estimated target period and (b) the power consumption amount during the remaining period satisfies predetermined conditions, the control unit 112 determines the estimated target time as time t1.

More specifically, the control unit 112 estimates a power consumption amount in an estimated target time, based on an outside air temperature o4 at a past time of turning the apparatus 101 ON (hereinafter, referred to as a "past starting time"), a room air temperature r4 at the past starting time, and power consumption c4 at the past starting time. The state of turning ON is a fluctuating state different from the stable state.

For example, based on the power consumption c4 and the room air temperature r4 at the past starting time which are similar to a current outside air temperature and a current room air temperature, respectively, the control unit 112 estimates a power consumption amount during an estimated target period from start of a DR period to an estimated target time and an achieved room air temperature at the estimated target time. Here, for each of estimated target times set for respective predetermined time intervals in the DR period, the control unit 112 estimates a power consumption amount and an achieved room air temperature.

Figure 13:
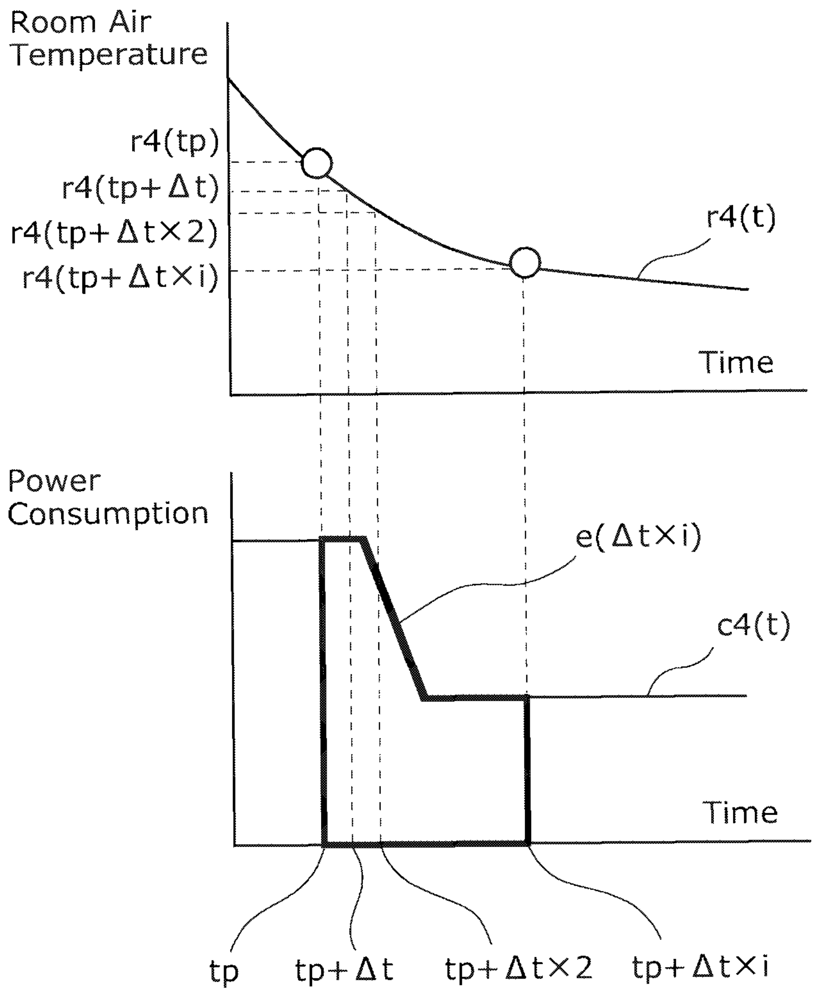
FIG. 13 is a graph plotting a past room air temperature and past power consumption according to Embodiment 1.

FIG. 13 is a diagram showing a room air temperature r4(*t*) and power consumption c4(*t*) where the room air temperature r4(*t*) is a room air temperature r4 at time t and the power consumption c4(*t*) is power consumption c4 at time t. A past power consumption amount e(Δt) from time tp to time (tp+Δt) is expressed by the following Equation 8.

[Math. 1]

$$\text{power consumption } e(\Delta t)=\int_{tp}^{tp+\Delta t} \text{power consumption } c4(t)dt \quad \text{(Equation 8)}$$

The control unit 112 estimates the power consumption amount e(Δt) as a power consumption amount from time t0 to time (t0+Δt). In addition, the control unit 112 estimates a room air temperature r4 (tp+Δt) as an achieved room air temperature at time (t0+Δt). Likewise, the control unit 112 estimates the power consumption amount e(Δt+2) as a power consumption amount from time t0 to time (t0+Δt×2). Furthermore, the control unit 112 estimates a room air temperature r4 (tp+Δt×2) as an achieved room air temperature at time (t0+Δt×2).

The control unit 112 repeats the above processing to estimate a power consumption amount e(Δt×i) and a room air temperature r4(tp+Δt×i) as a power consumption amount and an achieved room air temperature at an estimated target time (t0+Δt×i), respectively. As a result, the power consumption amount during the estimated target period and the achieved room air temperature at the estimated target time are estimated.

For another example, it is possible that maximum power consumption consumed at the time of turning the apparatus 101 ON is used as the power consumption c4 at the past starting time in order to estimate a power consumption amount during an estimated target period. In this case, the control unit 112 calculates power consumption according to the following Equation 9.

$$\text{power consumption}=\text{past power consumption } c4\times(\text{outside air temperature } o1-\text{room air temperature } r1)/(\text{outside air temperature } o4-\text{room air temperature } r4) \quad \text{(Equation 9)}$$

In Equation 9, the outside air temperature o1 is a current outside air temperature, and the room air temperature r1 is a current room air temperature. The outside air temperature o4 is an outside air temperature at the time of supplying the power consumption c4, and the room air temperature r4 is a room air temperature at the time of supplying the power consumption c4. By Equation 9, power consumption consumed during the estimated target period is calculated.

Then, based on the power consumption calculated by Equation 9, the control unit 112 can estimate a power consumption amount for each of predetermined time intervals in the DR period. Therefore, the control unit 112 can estimate a power consumption amount during an estimated target period. It is also possible that the control unit 112 estimates an achieved room air temperature at an estimated target time based on a change of a room air temperature at the time of supplying the power consumption c4.

On the other hand, power consumption during a remaining period is calculated by the above-presented Equation 4, 5, or 6. The control unit 112 can calculate a power consumption amount during a remaining period based on power consumption calculated by Equation 4, 5, or 6. It should be noted that the room air temperature r1 in Equation 4, 5, and 6 may be a room air temperature estimated as an achieved room air temperature at an estimated target time.

The control unit 112 specifies an estimated target time as time t1 (time for switching) so that a sum of (a) a power consumption amount during an estimated target period and (b) a power consumption amount during a remaining period satisfies the conditions determined according to a predetermined limit.

The conditions are, for example, that the sum of (a) the power consumption amount during the estimated target period and (b) the power consumption amount during the remaining period is equal to or lower than the predetermined limit. The conditions may be that the sum of (a) the power consumption during the estimated target period and (b) the power consumption during the remaining period is equal to the predetermined limit. The conditions may be that the sum of (a) the power consumption during the estimated target period and (b) the power consumption during the remaining period is within a predetermined range including the predetermined limit.

Typically, based on the above-presented Equations 6 and 8, the control unit 112 calculates Δtxi which satisfies the following Equation 10. Then, the control unit 112 determines time (t0+Δtxi) as time t1 based on the calculated Δtxi.

$$\text{power consumption amount } e(\Delta txi)+\{\text{power consumption for keeping room air temperature } r4(tp+\Delta txi) \text{ constant against outside air temperature } o1\times(DR \text{ period}-\Delta txi)\}=\text{predetermined limit} \quad \text{(Equation 10)}$$

Figure 14:
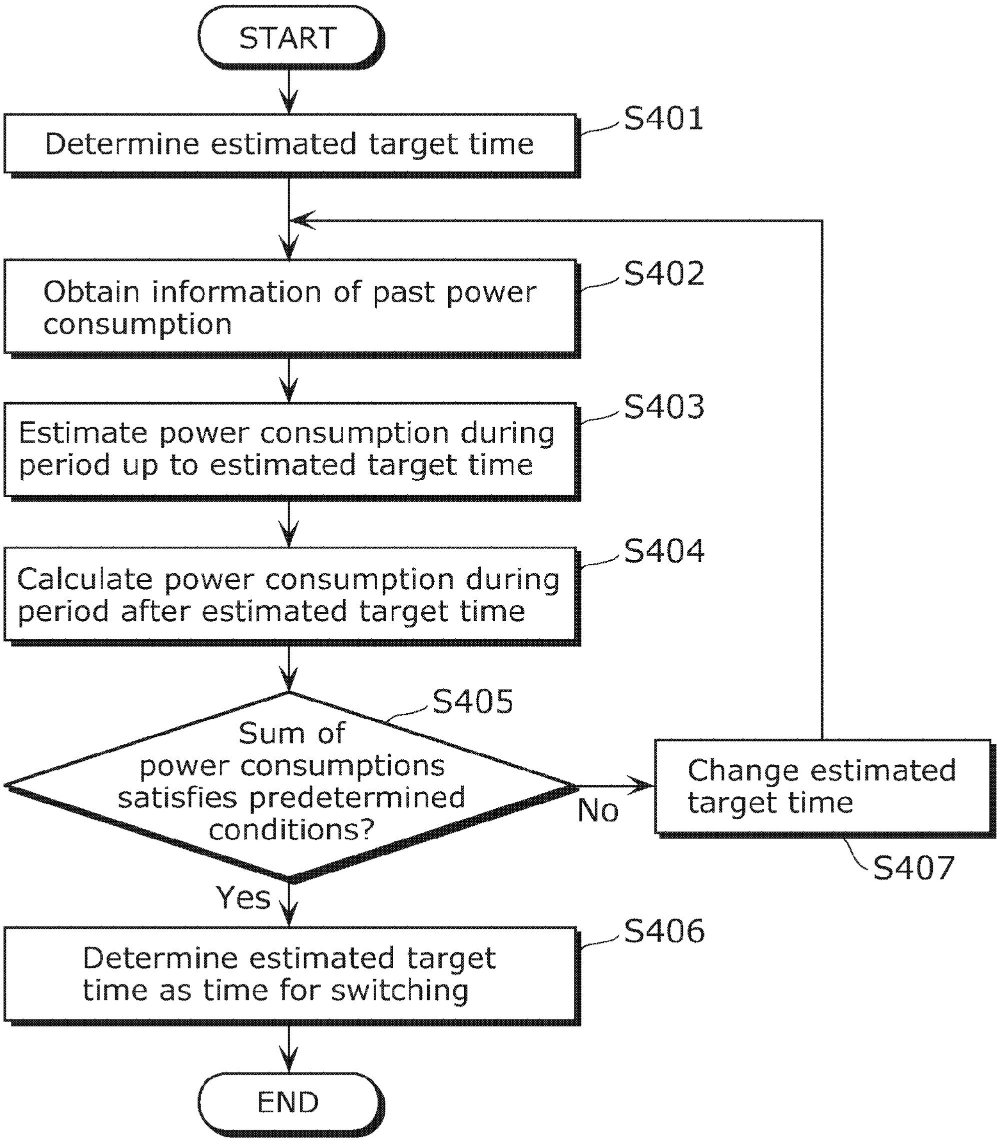
FIG. 14 is a flowchart of processing for determining a time for switching according to a variation of Embodiment 1.

FIG. 14 is a flowchart of the processing performed by the control unit 112 shown in FIGS. 3 and 4 to determine a time for switching based on past information. The flowchart of FIG. 14 corresponds to the step (S102) of obtaining a power consumption amount in FIG. 6 and the step (S111) of determining a time for switching in FIG. 7.

First, the control unit 112 determines an estimated target time (S401). Next, the obtainment unit 111 obtains data of a past power consumption amount (S402). More specifically, the obtainment unit 111 obtains, from the storage unit 113, data of a power consumption amount that is consumed prior to the DR period. Here, the obtainment unit 111 may obtain a power consumption amount for a unit time prior to the DR period, in other words, power consumption consumed prior to the DR period.

For example, the obtainment unit 111 obtains a current outside air temperature o1, a current room air temperature r1, an outside air temperature o3 in a stable state, a room air temperature r3 in the stable state, power consumption c3 in the stable state, an outside air temperature o4 in a fluctuating state, a room air temperature r4 in the fluctuating state, power consumption c4 in the fluctuating state, a room air temperature r5 fluctuated in the fluctuating state, and the like. The room air temperature r5 may be a room air temperature corresponding to the above-mentioned room air temperature r4 (tp+Δtxi).

Next, the control unit 112 estimates a power consumption amount consumed by the apparatus 101 during an estimated target period from start of a DR period to an estimated target time, based on the data of the power consumption amount obtained by the obtainment unit 111 (S403).

For example, the control unit 112 estimates a power consumption amount during the estimated target period according to Equation 8, based on power consumption calculated by Equation 8. Equation 8 uses past data closer to a current state. However, the control unit 112 may estimate an arbitral past power consumption amount as the power consumption amount during the estimated target period. In this case, the control unit 112 may adjust the estimated power consumption amount based on a current temperature difference, a temperature difference at a past time, a length of the estimated target period, and the like.

Next, the control unit 112 calculates a power consumption amount consumed by the apparatus 101 during a remaining period from the estimated target time to the end of the DR period (S404).

For example, according to Equation 5, the control unit 112 calculates power consumption in a state where power consumption is suppressed. Then, the control unit 112 calculates a power consumption amount consumed by the apparatus 101 in the remaining period when the apparatus 101 operates with the power consumption calculated according to Equation 5.

Equation 5 uses the current outside air temperature o1 and the current room air temperature r1. However, it is also possible that the control unit 112 estimates the outside air temperature and the room air temperature in the estimated target time, and uses the estimated outside air temperature and room air temperature in Equation 5 instead of the outside air temperature o1 and the room air temperature r1 in Equation 5. More specifically, the control unit 112 may estimate that the outside air temperature at the estimated target time is the outside air temperature o1 and the room air temperature at the estimated target time is the room air temperature r5. Then, in Equation 5, the room air temperature r5 may be used instead of the room air temperature r1.

Here, although the control unit 112 uses Equation 5, the control unit 112 may use Equation 6 or Equation 4.

Next, the control unit 112 determines whether or not a sum of (a) the power consumption amount during the estimated target period and (b) the power consumption amount during the remaining period satisfies conditions determined according to the predetermined limit (S405). Typically, the conditions are that the sum of (a) the power consumption during the estimated target period and (b) the power consumption during the remaining period is equal to the predetermined limit. If the sum satisfies the conditions (Yes at S405), then the control unit 112 determines the estimated target time as the time for switching (S406).

On the other hand, if the sum does not satisfy the conditions (No at S405), then the control unit 112 changes the estimated target time (S407). Then, the obtainment unit 111 and the control unit 112 repeat the above-described processing (S402 to S405). For example, the obtainment unit 111 and the control unit 112 repeat the above-described processing (S402 to S405), by gradually shifting the estimated target time afterwards.

It should be noted that the control unit 112 may estimate a power consumption amount during an estimated target period based on data of a past power consumption amount which has been already obtained, without newly obtaining data of a past power consumption amount, and calculate a power consumption amount during a remaining period based on the past power consumption amount. In this case, the obtainment unit 111 can eliminate the step (S402) of obtaining past power consumption from the second time.

The control device 100 operates according to the flowchart of FIG. 14 to appropriately determine a time for switching based on a past power consumption amount. Furthermore, the control device 100 can determine a time for switching before the time for switching. Therefore, delay of switching is suppressed. Therefore, the control device 100 can surely control a total power amount consumed by the apparatus 101 during a DR period to be equal to or lower than a predetermined limit. Furthermore, the control device 100 can appropriately determine a time for switching, based on a past power consumption amount corresponding to environments such as a room size, heat insulation properties, and the like.

As described above, the control device 100 according to the present embodiment controls the apparatus 101 with relatively high power during the first period immediately after receiving a DR signal. Then, the control device 100 controls the apparatus 101 to operate with relatively low power during the second period following the first period. The first period and the second period are switched according to a power consumption amount.

As a result, a total power amount consumed by the apparatus 101 during a predetermined period is appropriately controlled. In addition, the apparatus 101 can execute its ability earlier. In other words, the apparatus 101 can efficiently provide benefits that the apparatus should offer. Therefore, the control device 100 can control the apparatus 101 to effectively operate even if a DR signal is received.

It should be noted that the control device 100 mainly controls the apparatus 101 in the present embodiment. However, the control device 100 may control a plurality of apparatuses (for example, a plurality of apparatuses 101, 102, and 103) according to the DR signal.

Moreover, in the present embodiment, an application to DR is presented. However, the idea of the present disclosure is not limited to the DR, but may be applied to any states where reduction of power consumption is desired.

In addition, the control device 100 may control power supplied to the apparatus 101 to eventually control the operation of the apparatus 101, or may control the operation of the apparatus 101 to eventually control power supplied to the apparatus 101.

Furthermore, the control device 100 may control not only air conditioners but also various apparatuses such as water heaters, electrical floor heaters, illumination apparatuses, electromagnetic cookers, and the like.

Embodiment 2

The present embodiment give an example of the control device 100 according to Embodiment 1 controlling a plurality of apparatuses 101, 102, and 103. The control device 100 according to the present embodiment includes almost the same structural elements as those of the control device 100 according to Embodiment 1 shown in each of FIGS. 3 and 4.

Figure 15:
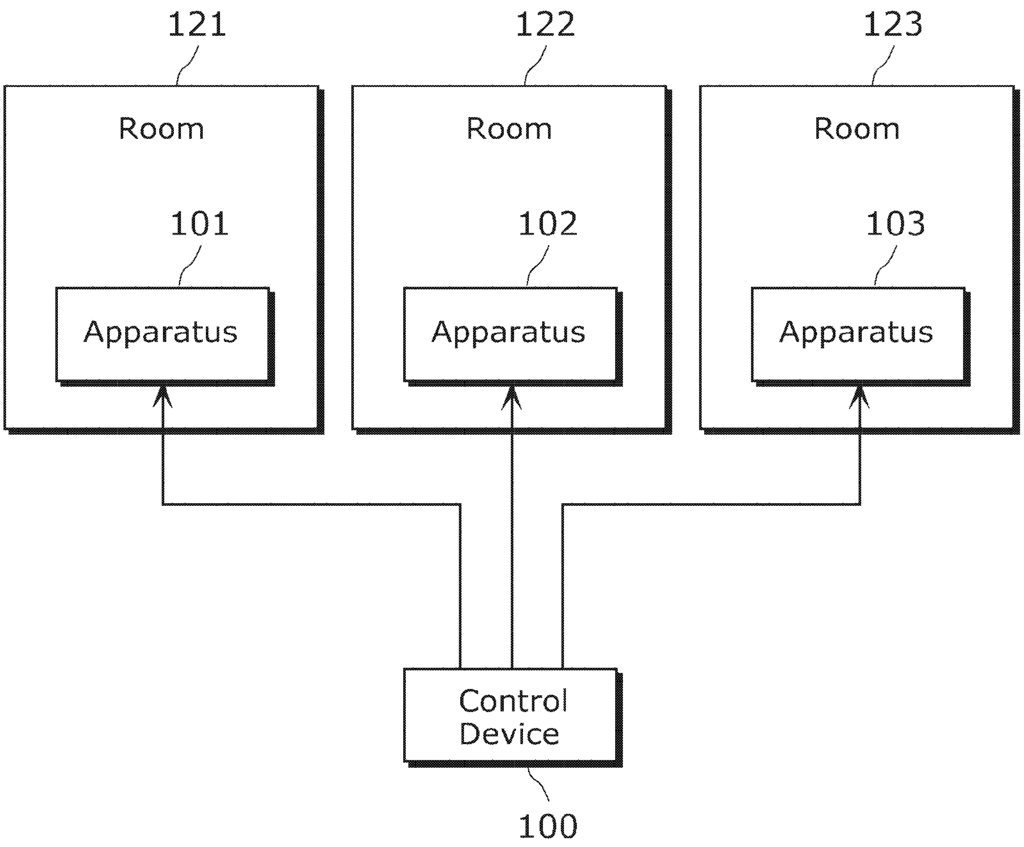
FIG. 15 is a block diagram of a control device that controls a plurality of apparatuses according to Embodiment 2.

FIG. 15 is a block diagram of the control device 100 that controls the plurality of apparatuses 101, 102, and 103 according to the present embodiment. In the present embodiment, the apparatuses 101, 102, and 103 are air conditioners (indoor equipment of air conditioners). The apparatus 101 is set in a room 121, the apparatus 102 is set in a room 122, and the apparatus 103 is set in a room 123.

Each of the apparatuses 101, 102, and 103 may be a multi-air conditioner. In this case, a single outdoor equipment (not shown) corresponding to the apparatuses 101, 102, and 103 is provided outside the rooms 121, 122, and 123. If each of the apparatuses 101, 102, and 103 is not a multi-air conditioner, a plurality of outdoor equipment (not shown) corresponding to the respective apparatuses 101, 102, and 103 is provided outside the rooms 121, 122, and 123.

The control device 100 includes the structural elements shown in each of FIGS. 3 and 4. The structural elements function in the same manner as described in Embodiment 1. More specifically, these structural elements function in the following manner.

The receiving unit 110 in the control device 100 receives a DR signal. This DR signal indicates a request for controlling each of the apparatus 101, 102, and 103 to restrict a total power amount consumed during a predetermined period to be equal to or lower than a predetermined limit. The total power amount may include a power amount of the outdoor equipment (not shown). Likewise, hereinafter, a power consumption amount and power consumption of each of the apparatuses 101, 102, and 103 may include a power consumption amount and power consumption of a corresponding outdoor equipment (not shown).

The obtainment unit 111 in the control device 100 obtains a power consumption amount consumed by the apparatuses 101, 102, and 103. The control unit 112 in the control device 100 controls the apparatuses 101, 102, and 103 to operate with power higher than average power during the first period. The control unit 112 controls the apparatuses 101, 102, and 103 to operate with power lower than the average power during the second period.

Figure 16:
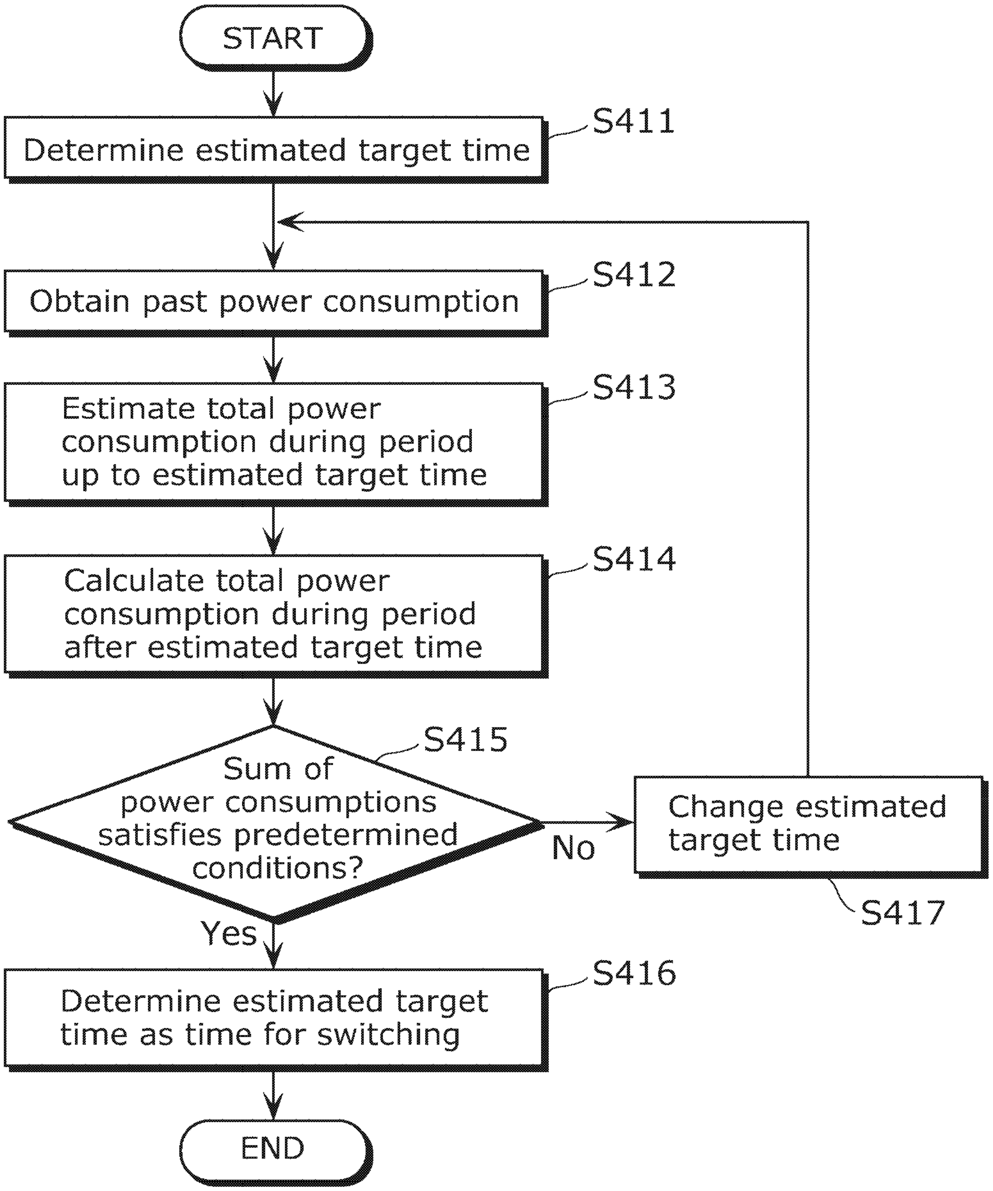
FIG. 16 is a flowchart of processing for determining a time for switching according to Embodiment 2.

FIG. 16 is a flowchart of the processing performed by the control unit 112 shown in each of FIGS. 3 and 4 to determine a time for switching. The flowchart of FIG. 16 corresponds to the flowchart of FIG. 14.

First, the control unit 112 determines an estimated target time (S411). Next, the obtainment unit 111 obtains a past power consumption amount (S412).

For example, the obtainment unit 111 obtains a current outside air temperature o1, a current room air temperature r1[*i*], an outside air temperature o3 in a stable state, a room air temperature r3[*i*] in the stable state, and power consumption c3 in the stable state, an outside air temperature o4 in a fluctuating state, a room air temperature r4[*i*] in the fluctuating state, power consumption c4 in the fluctuating state, a room air temperature r5[*i*] fluctuated in the fluctuating state, and the like.

Here, the room air temperatures r1[*i*], r3[*i*], r4[*i*], and r5[*i*] correspond to the room air temperatures r1, r3, r4, and r5, respectively, in Embodiment 1. They correspond to the rooms 121, 122, and 123. More specifically, the room air temperatures r1[1], r3[1], r4[1], and r5[1] correspond to the room 121, the room air temperatures r1[2], r3[2], r4[2], and r5[2] correspond to the room 122, and the room air temperatures r1[3], r3[3], r4[3], and r5[3] correspond to the room 123.

It is desirable that the obtainment unit 111 obtains the outside air temperature o4, the room air temperature r4[*i*], and power consumption c4 at a past starting time in a state similar to the current state. Here, the current state is (1) the current outside air temperature o1, (2) whether or not each of the apparatuses 101, 102, and 103 operates (operating state and the number of operating apparatuses), and (3) a current room air temperature and the like in each of at least one of the rooms where at least one of the apparatuses 101, 102, and 103 operates.

Next, the control unit 112 estimates a power consumption amount consumed by each of the apparatuses 101, 102, and 103 during an estimated target period from start of a DR period to an estimated target time, based on the data of the power consumption amount obtained by the obtainment unit 111 (S413). If the room air temperature r4[*i*] and the power consumption c4 at a past starting time in a state similar to the current state are obtained, the control unit 112 estimates a power consumption amount consumed during the estimated target period by Equation 8. In other words, like Embodiment 1, the control unit 112 can estimate a past power consumption amount as a power consumption amount during the estimated target period.

It is also possible that a past maximum power consumption is used as the power consumption c4 to estimate power consumption. In this case, the control unit 112 calculates power consumption corresponding to the estimated target period according to the following Equation 11 corresponding to FIG. 9.

$$\text{power consumption}=\text{past power consumption } c4\times\{\text{total of (outside air temperature o1}-\text{room air temperature } r1[i])\}/\{\text{total of (outside air temperature } o4-\text{room air temperature } r4[i]\} \quad \text{(Equation 11)}$$

{total of (outside air temperature o1−room air temperature r1[*i*])} in Equation 11 indicates a total temperature difference among the rooms 121, 122, and 123 at the current time. {total of (outside air temperature o4−room air temperature r4[*i*])} in Equation 11 indicates a total temperature difference among the rooms 121, 122, and 123 in the fluctuating state. FIG. 112 calculates a power consumption amount consumed by each of the apparatuses 101, 102, and 103 operating during an estimated target period with power consumption calculated according to Equation 11.

The control unit 112 may estimate an arbitral past power consumption amount as the power consumption amount during the estimated target period. In this case, the control unit 112 may adjust an estimated power consumption amount estimated based on (a) a total temperature difference among the rooms 121, 122, and 123 at a current time, (b) a total temperature difference among the rooms 121, 122, and 123 at a past time, and (c) a length of the estimated target period.

Next, the control unit 112 calculates a power consumption amount consumed by each of the apparatuses 101, 102, and 103 during a remaining period from the estimated target time to the end of the DR period (S414). For example, according to Equation 12, the control unit 112 calculates power consumption in a state where power consumption is suppressed.

$$\text{power consumption}=\text{past power consumption } c3\times\{\text{total of (outside air temperature } o1-\text{room air temperature } r1[i])\}/\{\text{total of (outside air temperature } o3-\text{room air temperature } r3[i])\} \quad \text{(Equation 12)}$$

{total of (outside air temperature o1−room air temperature r1[*i*])} in Equation 12 indicates a total temperature difference among the rooms 121, 122, and 123 at the current time. {total of (outside air temperature o4−room air temperature r4[*i*])} in Equation 12 indicates a total temperature difference among the rooms 121, 122, and 123 in the stable state. FIG. 112 calculates a power consumption amount consumed by each of the apparatuses 101, 102, and 103 operating during the remaining period with power consumption calculated according to Equation 12.

Equation 12 uses the outside air temperature o1 and the room air temperature r1[*i*] at a current time. However, it is also possible that the control unit 112 estimates the outside air temperature and the room air temperature at the estimated target time, and uses the estimated outside air temperature and room air temperature in Equation 12 instead of the outside air temperature o1 and the room air temperature r1[*i*] in Equation 12. More specifically, the control unit 112 may estimate that the outside air temperature at the estimated target time is the outside air temperature o1 and the room air temperature at the estimated target time is the room air temperature r5[*i*]. Then, the control unit 112 may use the room air temperature r5[*i*] instead of the room air temperature r1[*i*] in Equation 12.

Equation 12 may be modified based on basic power consumption in the same manner as Equation 6. For example, by using a power consumption change rate d corresponding to a total temperature difference, the same equation as Equation 6 is derived.

Next, the control unit 112 determines whether or not a sum of (a) a power consumption amount during the estimated target period and (b) a power consumption amount during the remaining period satisfies conditions determined according to the predetermined limit (S415). Typically, the conditions are that the sum of (a) the power consumption amount during the estimated target period and (b) the power consumption amount during the remaining period is equal to the predetermined limit. If the sum satisfies the conditions (Yes at S415), then the control unit 112 determines the estimated target time as the time for switching (S416).

On the other hand, if the sum does not satisfy the conditions (No at S415), then the control unit 112 changes the estimated target time (S417). Then, the control unit 112 repeats the above-described processing (S412 to S415).

Thereby, based on a room air temperature of each of the rooms 121, 122, and 123, a time for switching is appropriately determined. Therefore, the control device 100 can surely restrict the total power amount consumed by the apparatuses 101, 102, and 103 during the DR period to be equal to or lower than the predetermined limit. More specifically, even if the apparatuses 101, 102, and 103 form a multi-air conditioner, the control device 100 can control a total power amount of the multi-air conditioner to be equal to or lower than the predetermined limit.

It should be noted that it has been described in the present embodiment that the control unit 112 uses a past power consumption amount to calculate a power consumption amount to determine a time for switching. However, even if the apparatuses 101, 102, and 103 form a multi-air conditioner, the control unit 112 may calculate a power consumption amount based on rated power consumption to determine a time for switching in the same manner as described in Embodiment 1.

In the present embodiment, the outside air temperature is assumed to be the same for the rooms 121, 122, and 123. However, it is also possible that the obtainment unit 111 obtains an outside air temperature o1[*i*] of the room 121, an outside air temperature o3[*i*] of the room 122, and an outside air temperature o4[*i*] of the room 123, and that the control unit 112 controls the apparatuses 101, 102, and 103 based on these outside air temperatures.

In the present embodiment, the control device 100 controls mainly the three apparatuses 101, 102, and 103. However, the number of apparatuses controlled by the control device 100 is not limited to three, but may be any.

As described in the above embodiments, the control device according to the present disclosure controls an apparatus to operate with relatively high power during the first period after receiving a DR signal. Then, the control device controls the apparatus to operate with relatively low power during the second period following the first period. The first period and the second period are appropriately switched according to a power consumption amount.

As a result, a total power amount consumed by the apparatus during a predetermined period is appropriately controlled. In addition, the apparatus can execute its ability earlier. In other words, the apparatus can efficiently provide benefits that the apparatus should offer. Therefore, the control device can control the apparatus to effectively operate even if a DR signal is received.

It should be noted that, in the above-described embodiments, each of the structural elements may be implemented to a dedicated hardware, or may be implemented by executing a software program suitable for each of the structural elements. Each of the structural elements may be executed by a program execution unit, such as a CPU or a processor, to read a software program from a recording medium, such as a hard disk or a semiconductor memory, and execute the readout program. Here, the software program for implementing the control device or the like in each of the above embodiments may be the following program.

More specifically, the program causes a computer to execute: receiving a control request signal, the control request signal indicating a request for controlling a total power amount consumed by an apparatus during a predetermined period to be equal to or lower than a predetermined limit; obtaining a power consumption amount consumed by the apparatus; and controlling the apparatus to operate according to the received control request signal, and control the total power amount consumed by the apparatus during the predetermined period to be equal to or lower than the predetermined limit. Here, the controlling includes: determining a first time in the predetermined period, based on the obtained power consumption amount; controlling the apparatus to operate during a first period from a start of the predetermined period to the first time with power higher than average power calculated based on the predetermined limit and the predetermined period; and controlling the apparatus to operate during a second period from the first time to end of the predetermined period with power lower than the average power.

Although the embodiments have been described as examples, the claims of the present disclosure are not limited to the embodiments. Those skilled in the art will be readily appreciated that various modifications of the exemplary embodiments and combinations of the structural elements of the different embodiments are possible without materially departing from the novel teachings and advantages of the present disclosure. Accordingly, all such modifications and other embodiments are intended to be included within the scope of the present disclosure.

INDUSTRIAL APPLICABILITY

The control devices according to one or more exemplary embodiments disclosed herein are usable to control a power consumption amount of various apparatuses such as water heaters, electrical floor heaters, illumination apparatuses, electromagnetic cookers, and the like.

The invention claimed is:

1. A control device comprising:

a receiver that receives a control request signal, the control request signal indicating a request for controlling a total power amount consumed by an air conditioner during a predetermined period to be lower than or equal to a predetermined limit;

an obtainer that obtains a power consumption amount consumed by the air conditioner; and a controller that causes the air conditioner to operate according to the control request signal received by the receiver, and controls the total power amount consumed by the air conditioner during the predetermined period to be lower than or equal to the predetermined limit, wherein the controller performs:

determining a first time in the predetermined period, based on the power consumption amount obtained by the obtainer;

causing the air conditioner to operate during a first period from a start of the predetermined period to the first time with power higher than average power calculated based on the predetermined limit and the predetermined period, after increasing the power consumed by the air conditioner to be higher than the average power;

wherein the average power is power obtained by averaging the predetermined limit by the predetermined period; and causing the air conditioner to operate during a second period from an end of the first time to an end of the predetermined period with power lower than the average power, after decreasing the power consumed by the air conditioner to be lower than the average power, wherein the obtainer further obtains an outside air temperature and a room air temperature, and wherein the controller performs:

calculating an upper limit according to the outside air temperature and the room air temperature, the upper limit being power for keeping the room air temperature in a predetermined range, the upper limit being power lower than the average power; and causing the air conditioner to operate during the second period with power lower than or equal to the upper limit, after decreasing the power consumed by the air conditioner to be lower than or equal to the upper limit.

2. The control device according to claim 1, wherein the controller causes the air conditioner to operate during the second period with power that is lower than or equal to the upper limit after decreasing the power consumed by the air conditioner to be lower than or equal to the upper limit, the upper limit being power for keeping the room air temperature to be lower than or equal to a room air temperature at the first time, the upper limit being power lower than the average power.

3. The control device according to claim 1, wherein the controller causes the air conditioner to operate during the second period with power that is lower than or equal to the upper limit after decreasing the power consumed by the air conditioner to be lower than or equal to the upper limit, the upper limit being power for keeping the room air temperature to be higher than or equal to a room air temperature at the first time, and the upper limit being power lower than the average power.

4. The control device according to claim 1, wherein the controller multiplies (a) a temperature difference between the outside air temperature and the room air temperature by (b) a numeric value obtained from rated power consumption of the air conditioner to obtain the upper limit.

5. The control device according to claim 1, wherein the obtainer:

obtains the outside air temperature as a first outside air temperature and obtains the room air temperature as a first room air temperature; and obtains a second outside air temperature in a stable state where a room air temperature is kept constant, a second room air temperature in the stable state, and a power consumption amount per unit time in the stable state, from a storage holding a plurality of outside air temperatures at past times, room air temperatures at the past times, and power consumption amounts per unit time at the past times, and the controller multiplies (a) a ratio of (a-1) a temperature difference between the first outside air temperature and the first room air temperature to (a-2) a temperature difference between the second outside air temperature and the second room air temperature by (b) the power consumption amount per the unit time in the stable state to obtain the upper limit.

6. The control device according to claim 5, wherein the obtainer:

obtains, from the storage, a power consumption amount per unit time in a fluctuating state different from the stable state, as the power consumption amount consumed by the air conditioner; and further obtains a third outside air temperature in the fluctuating state and a third room air temperature in the fluctuating state from the storage, and the controller performs:

multiplying (a) a ratio of (a-1) a temperature difference between the first outside air temperature and the first room air temperature to (a-2) a temperature difference between the third outside air temperature and the third room air temperature by (b) the power consumption amount per the unit time in the fluctuating state, to estimate a power consumption amount consumed by the air conditioner during an estimated target period from the start of the predetermined period to the second time;

calculating a power consumption amount consumed by the air conditioner during a remaining period from the second time to an end of the predetermined period, when the air conditioner operates during the remaining period with power equal to the upper limit; and determining whether or not a sum of (a) the power consumption amount during the estimated target period and (b) the power consumption amount during the remaining period satisfies conditions determined according to the predetermined limit, and if the sum satisfies the conditions, deciding the second time as the first time.

7. The control device according to claim 6, wherein the obtainer obtains a fourth room air temperature after the fluctuating state from the storage, and the controller performs:

estimating a room air temperature at the second time as the first room air temperature used to calculate the upper limit, according to the fourth room air temperature;

multiplying (a) a ratio of (a-1) the temperature difference between the first outside air temperature and the first room air temperature to (a-2) the temperature difference between the second outside air temperature and the second room air temperature by (b) the power consumption amount per the unit time in the stable state to obtain the upper limit; and calculating the power consumption amount consumed by the air conditioner during the remaining period, when the air conditioner operates during the remaining period with power equal to the upper limit.

8. The control device according to claim 1, wherein the obtainer obtains, as the power consumption amount consumed by the air conditioner, one of (a) power consumption that is a power consumption amount per unit time consumed by the air conditioner at present or in past, (b) a power consumption amount consumed by the air conditioner up to a current time, and (c) a power consumption amount consumed by the air conditioner up to a past time.

9. The control device according to claim 1, wherein the control device is included in the air conditioner.

10. The control device according to claim 1, wherein the receiver receives the control request signal indicating a request for restricting the total power consumption consumed by a plurality of air conditioners each of which is the air conditioner during the predetermined period, to be lower than or equal to the predetermined limit, the obtainer obtains the power consumption amount consumed by the plurality of air conditioners, and the controller performs:

causing the plurality of air conditioners to operate during the first period with power higher than the average power, after increasing the power consumed by the plurality of air conditioners to be higher than the average power; and causing the plurality of air conditioners to operate during the second period with power lower than or equal to the upper limit that is power lower than the average power, after decreasing the power consumed by the plurality of air conditioners to be lower than or equal to the upper limit.

11. A control device comprising:

a receiver that receives a control request signal, the control request signal indicating a request for controlling a total power amount consumed by an air conditioner during a predetermined period to be lower than or equal to a predetermined limit;

an obtainer that obtains a power consumption amount consumed by the air conditioner; and a controller that causes the air conditioner to operate according to the control request signal received by the receiver, and controls the total power amount consumed by the air conditioner during the predetermined period to be lower than or equal to the predetermined limit, wherein the controller performs:

determining a first time in the predetermined period, based on the power consumption amount obtained by the obtainer;

causing the air conditioner to operate during a first period from a start of the predetermined period to the first time with power higher than average power calculated based on the predetermined limit and the predetermined period, after increasing the power consumed by the air conditioner to be higher than the average power;

wherein the average power is power obtained by averaging the predetermined limit by the predetermined period; and causing the air conditioner to operate during a second period from an end of the first time to an end of the predetermined period with power lower than or equal to an upper limit, after decreasing the power consumed by the air conditioner to be lower than or equal to the upper limit, the upper limit being power for keeping a room air temperature in a predetermined range, the upper limit being power lower than the average power, wherein the obtainer obtains a power consumption amount during an operation period from the start of the predetermined period to a current time, as the power consumption amount consumed by the air conditioner, and wherein the controller performs:

calculating a power consumption amount consumed by the air conditioner during a remaining period from the current time to an end of the predetermined period, when the air conditioner operates during the remaining period with power equal to the upper limit; and determining whether or not a sum of (a) the power consumption amount during the operating period and (b) the power consumption amount during the remaining period is equal to the predetermined limit, and if the sum is equal to the predetermined limit, determining the current time as the first time.

12. A control device comprising:

a receiver that receives a control request signal, the control request signal indicating a request for controlling a total power amount consumed by an air conditioner during a predetermined period to be lower than or equal to a predetermined limit;

an obtainer that obtains a power consumption amount consumed by the air conditioner; and a controller that causes the air conditioner to operate according to the control request signal received by the receiver, and controls the total power amount consumed by the air conditioner during the predetermined period to be lower than or equal to the predetermined limit, wherein the controller performs:

determining a first time in the predetermined period, based on the power consumption amount obtained by the obtainer;

causing the air conditioner to operate during a first period from a start of the predetermined period to the first time with power higher than average power calculated based on the predetermined limit and the predetermined period, after increasing the power consumed by the air conditioner to be higher than the average power;

wherein the average power is power obtained by averaging the predetermined limit by the predetermined period; and causing the air conditioner to operate during a second period from an end of the first time to an end of the predetermined period with power lower than or equal to an upper limit, after decreasing the power consumed by the air conditioner to be lower than or equal to the upper limit, the upper limit being power for keeping a room air temperature in a predetermined range, the upper limit being power lower than the average power, wherein the obtainer obtains, as the power consumption amount consumed by the air conditioner, a power consumption amount prior to the predetermined period from a storage holding the power consumption amount prior to the predetermined period, and the controller performs:

estimating a power consumption amount consumed by the air conditioner during an estimated target period from the start of the predetermined period to a second time, according to the power consumption amount obtained by the obtainer;

calculating a power consumption amount consumed by the air conditioner during a remaining period from the second time to the end of the predetermined period, when the air conditioner operates during the remaining period with power equal to the upper limit; and determining whether or not a sum of (a) the power consumption amount during the estimated target period and (b) the power consumption amount during the remaining period satisfies conditions determined according to the predetermined limit, and if the sum satisfies the conditions, deciding the second time as the first time.

13. A control method comprising:

receiving a control request signal, the control request signal indicating a request for controlling a total power amount consumed by an air conditioner during a predetermined period to be lower than or equal to a predetermined limit;

obtaining a power consumption amount consumed by the air conditioner; and causing, using a processor, the air conditioner to operate according to the received control request signal, and controlling, using the processor, the total power amount consumed by the air conditioner during the predetermined period to be lower than or equal to the predetermined limit, wherein the causing and the controlling include:

determining a first time in the predetermined period, based on the obtained power consumption amount;

causing the air conditioner to operate during a first period from a start of the predetermined period to the first time with power higher than average power calculated based on the predetermined limit and the predetermined period, after increasing the power consumed by the air conditioner to be higher than the average power;

wherein the average power is power obtained by averaging the predetermined limit by the predetermined period; and causing the air conditioner to operate during a second period from an end of the first time to an end of the predetermined period with power lower than the average power, after decreasing the power consumed by the air conditioner to be lower than the average power, in the obtaining, an outside air temperature and a room air temperature are further obtained, and the causing of the air conditioner to operate according to the received control request signal and the controlling further include:

calculating an upper limit according to the outside air temperature and the room air temperature, the upper limit being power for keeping the room air temperature in a predetermined range, the upper limit being power lower than the average power, and causing the air conditioner to operate during the second period with power lower than or equal to the upper limit, after decreasing the power consumed by the air conditioner to be lower than or equal to the upper limit.

14. A non-transitory computer-readable recording medium on which a program for causing a computer to execute the control method according to claim 13 is recorded.

15. An integrated circuit comprising:

a receiver that receives a control request signal, the control request signal indicating a request for controlling a total power amount consumed by an air conditioner during a predetermined period to be lower than or equal to a predetermined limit;

an obtainer that obtains a power consumption amount consumed by the air conditioner; and a controller that causes the air conditioner to operate according to the control request signal received by the receiver, and controls the total power amount consumed by the air conditioner during the predetermined period to be lower than or equal to the predetermined limit, wherein the controller performs:

determining a first time in the predetermined period, based on the power consumption amount obtained by the obtainer;

causing the air conditioner to operate during a first period from a start of the predetermined period to the first time with power higher than average power calculated based on the predetermined limit and the predetermined period, after increasing the power consumed by the air conditioner to be higher than the average power;

wherein the average power is power obtained by averaging the predetermined limit by the predetermined period; and causing the air conditioner to operate during a second period from an end of the first time to an end of the predetermined period with power lower than the average power, after decreasing the power consumed by the air conditioner to be lower than the average power, the obtainer further obtains an outside air temperature and a room air temperature, and wherein the controller performs:

calculating an upper limit according to the outside air temperature and the room air temperature, the upper limit being power for keeping the room air temperature in a predetermined range, the upper limit being power lower than the average power, and causing the air conditioner to operate during the second period with power lower than or equal to the upper limit, after decreasing the power consumed by the air conditioner to be lower than or equal to the upper limit.

* * * * *